US012591525B2

(12) United States Patent
Levy-Rubin et al.

(10) Patent No.: US 12,591,525 B2
(45) Date of Patent: Mar. 31, 2026

(54) MECHANISMS FOR ARBITRATING AMONG PACKETS IN HIERARCHICAL ARBITRATION ARCHITECTURE

(71) Applicant: Apple Inc., Cupertino, CA (US)

(72) Inventors: Lital Levy-Rubin, Tel Aviv (IL); Daniel U. Becker, San Jose, CA (US); Moti Altahan, Kiryat Ono (IL); Nabeel Achlaug, Kfar Kama (IL); Rafael K. Vivas Maeda, Santa Clara, CA (US); Jeonghee Shin, Sunnyvale, CA (US); Roi Uziel, Misgav (IL)

(73) Assignee: Apple Inc., Cupertino, CA (US)

( * ) Notice: Subject to any disclaimer, the term of this patent is extended or adjusted under 35 U.S.C. 154(b) by 34 days.

(21) Appl. No.: 18/884,854

(22) Filed: Sep. 13, 2024

(65) Prior Publication Data

US 2026/0079860 A1      Mar. 19, 2026

(51) Int. Cl.
*G06F 13/16*        (2006.01)
*G06F 9/455*        (2018.01)

(52) U.S. Cl.
CPC ...... *G06F 13/1605* (2013.01); *G06F 9/45533* (2013.01); *G06F 13/1642* (2013.01)

(58) Field of Classification Search
None
See application file for complete search history.

(56) References Cited

U.S. PATENT DOCUMENTS

| | | | | |
|---|---|---|---|---|
| 4,621,342 A | * | 11/1986 | Capizzi | G06F 13/374 710/111 |
| 6,487,213 B1 | * | 11/2002 | Chao | H04L 49/20 370/428 |
| 7,020,131 B1 | | 3/2006 | Yun et al. | |
| 7,796,629 B1 | * | 9/2010 | MacAdam | H04L 49/65 370/352 |
| 2008/0117913 A1 | * | 5/2008 | Tatar | H04L 49/1546 370/392 |
| 2011/0072177 A1 | | 3/2011 | Glasco et al. | |
| 2011/0185241 A1 | | 7/2011 | Erickson | |
| 2011/0302345 A1 | * | 12/2011 | Boucard | H04L 47/2441 710/123 |
| 2019/0303325 A1 | * | 10/2019 | Desai | G06F 9/466 |

(Continued)

*Primary Examiner* — Michael Sun

(74) *Attorney, Agent, or Firm* — Kowert, Hood, Munyon, Rankin & Goetzel, P.C.; Mark D. Seegers; Dean M. Munyon

(57) ABSTRACT

In an embodiment, a computer system comprises one or more co-packaged integrated circuits having a communication fabric that couples various agent circuits. The agent circuits transmit packets via the communication fabric, which can include command-data packets and command packets. In various embodiments, the communication fabric includes an arbitration circuit to arbitrate among packets to transmit on the fabric. The command-data packets may be allocated to a first plurality of virtual channels while the command packets are allocated to a second plurality of virtual channels. The arbitration circuit may arbitrate among the first plurality of virtual channels to select a command-data packet and the second plurality of virtual channels to select a command packet. The arbitration circuit may then arbitrate between the selected command-data packet and the selected command packet to select a winning packet to transmit based on a history of previously selected packets.

20 Claims, 18 Drawing Sheets

(56)  References Cited

U.S. PATENT DOCUMENTS

| | | |
|---|---|---|
| 2020/0059437 A1 | 2/2020 | Donley et al. |
| 2022/0006750 A1 * | 1/2022 | Livne .................... H04L 43/106 |
| 2022/0342607 A1 | 10/2022 | Benisty |

* cited by examiner

System _100_

Integrated Circuit Assembly _110_

Integrated Circuit Die _115B_

Memory _125B_

Memory Controller Circuit _120B_

Communication Fabric _140B_

Arbitration Circuit _150_

Agent Circuit _130D_

GPU Complex _136B_

Agent Circuit _130C_

GPU Complex _136A_

Integrated Circuit Die _115A_

Memory _125A_

Memory Controller Circuit _120A_

Communication Fabric _140A_

Arbitration Circuit _150_

Agent Circuit _130B_

CPU Complex _134_

Agent Circuit _130A_

Input/Output (I/O) Circuit 132

Peripheral _133_

Counter
Value
815

| Arbitration Cycle | Bulk Virtual Channel | Low-Latency Virtual Channel | Real-Time Virtual Channel | Winner |
|---|---|---|---|---|
| 1 | 0->4 | 0 | 0 | Bulk |
| 2 | 4 | 0->2 | 0 | Low-Latency |
| 3 | 4 | 2 | 0->1 | Real-Time |
| 4 | 4 | 2 | 1->2 | Real-Time |
| 5 | 4 | 2->4 | 2 | Low-Latency |
| 6 | 4 | 4 | 2->3 | Real-Time |
| 7 | 4 | 4 | 3->4 | Real-Time |
| 8 | 4->8 | 4 | 4 | Bulk |
| 9 | 8 | 4->6 | 4 | Low-Latency |
| 10 | 8 | 6 | 4->5 | Real-Time |
| 11 | 8 | 6 | 5->6 | Real-Time |
| 12 | 8 | 6->8 | 6 | Low-Latency |
| 13 | 8 | 8 | 6->7 | Real-Time |
| 14 | 8 | 8 | 7->8 | Real-Time |
| 15 | 8->12->0 | 8->0 | 8->0 | Bulk |

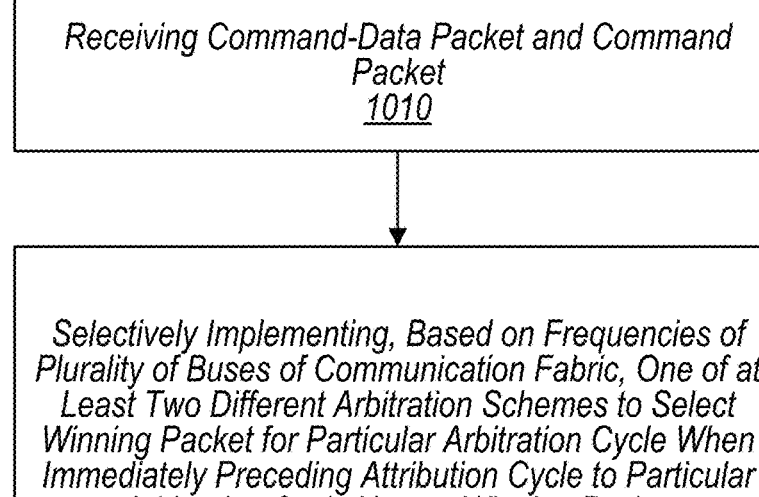

Receiving Command-Data Packet and Command
Packet
1010

Selectively Implementing, Based on Frequencies of
Plurality of Buses of Communication Fabric, One of at
Least Two Different Arbitration Schemes to Select
Winning Packet for Particular Arbitration Cycle When
Immediately Preceding Attribution Cycle to Particular
Arbitration Cycle Has no Winning Packet
1020

Transmitting Winning Packet on Communication Fabric
1030

FIG. 10

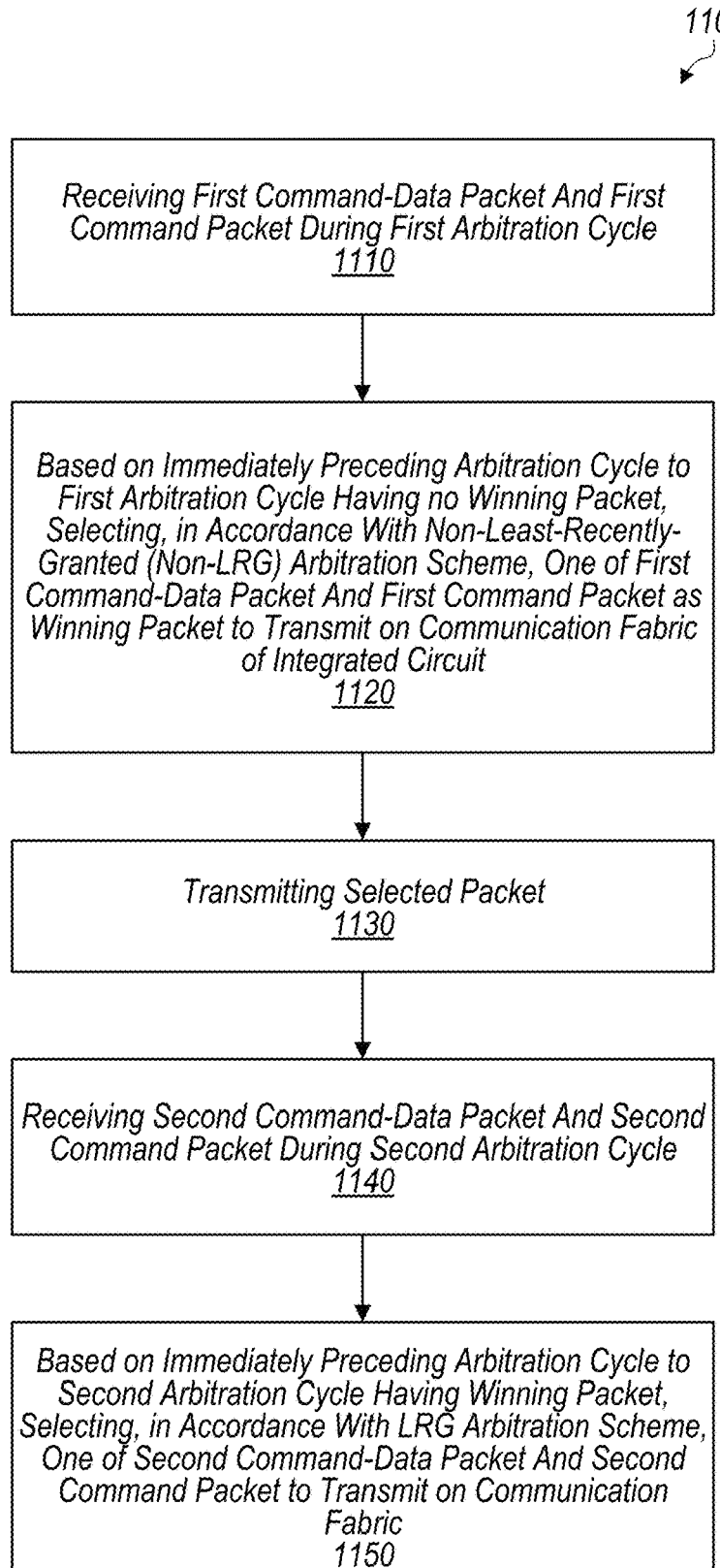

*1100*

Receiving First Command-Data Packet And First Command Packet During First Arbitration Cycle
*1110*

Based on Immediately Preceding Arbitration Cycle to First Arbitration Cycle Having no Winning Packet, Selecting, in Accordance With Non-Least-Recently-Granted (Non-LRG) Arbitration Scheme, One of First Command-Data Packet And First Command Packet as Winning Packet to Transmit on Communication Fabric of Integrated Circuit
*1120*

Transmitting Selected Packet
*1130*

Receiving Second Command-Data Packet And Second Command Packet During Second Arbitration Cycle
*1140*

Based on Immediately Preceding Arbitration Cycle to Second Arbitration Cycle Having Winning Packet, Selecting, in Accordance With LRG Arbitration Scheme, One of Second Command-Data Packet And Second Command Packet to Transmit on Communication Fabric
*1150*

FIG. 11

*1200*
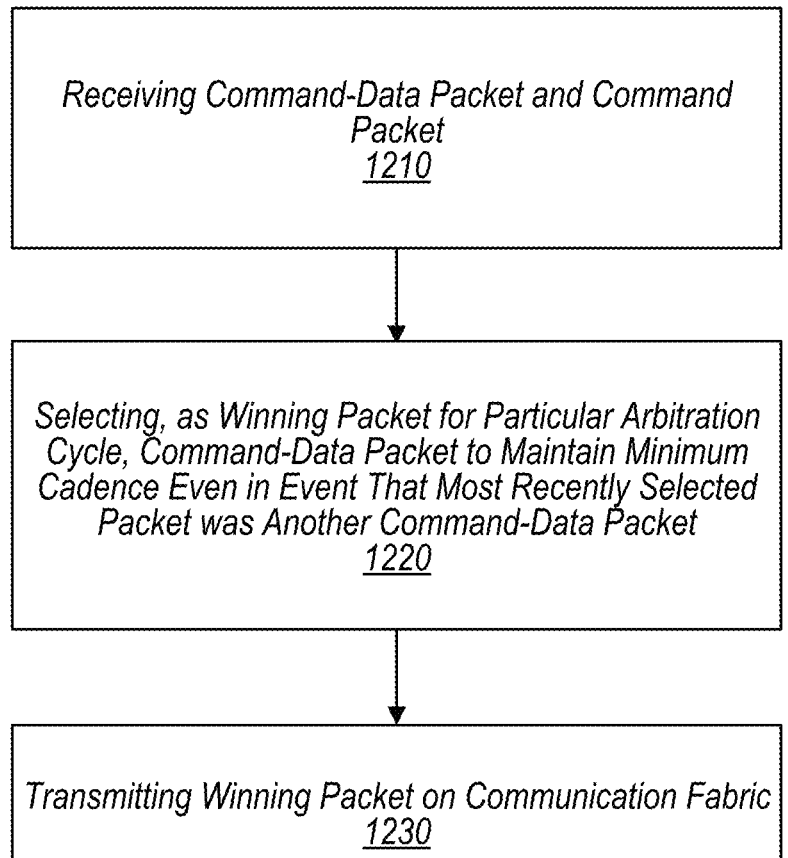
Receiving Command-Data Packet and Command
Packet
*1210*
Selecting, as Winning Packet for Particular Arbitration
Cycle, Command-Data Packet to Maintain Minimum
Cadence Even in Event That Most Recently Selected
Packet was Another Command-Data Packet
*1220*
Transmitting Winning Packet on Communication Fabric
*1230*
FIG. 12

*1300*

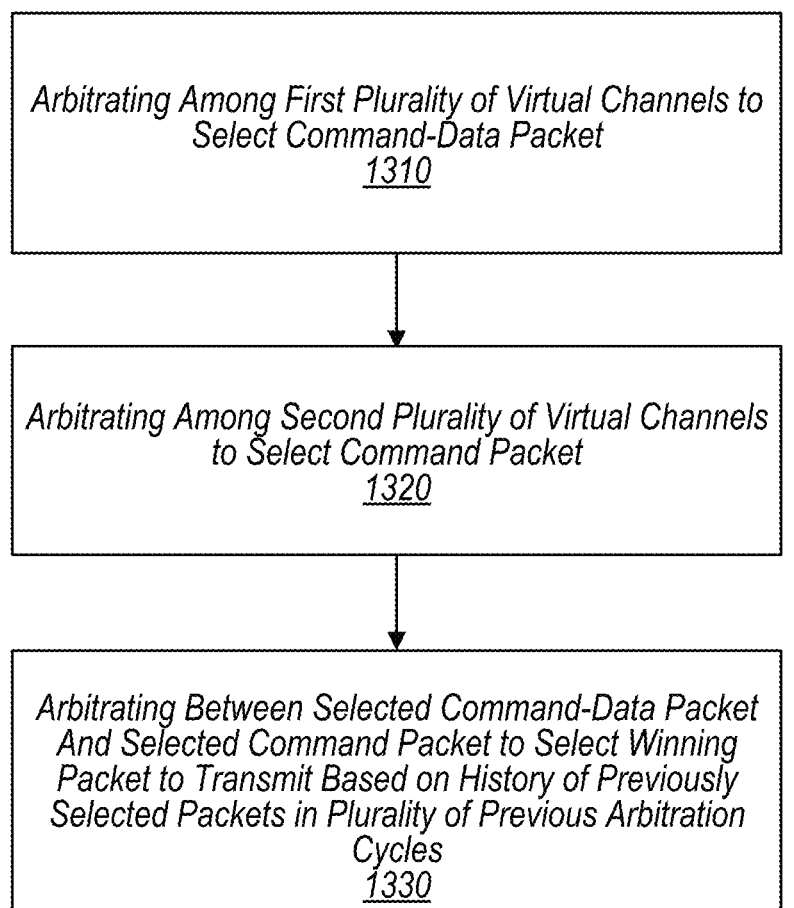

Arbitrating Among First Plurality of Virtual Channels to Select Command-Data Packet
*1310*

Arbitrating Among Second Plurality of Virtual Channels to Select Command Packet
*1320*

Arbitrating Between Selected Command-Data Packet And Selected Command Packet to Select Winning Packet to Transmit Based on History of Previously Selected Packets in Plurality of Previous Arbitration Cycles
*1330*

FIG. 13

1400

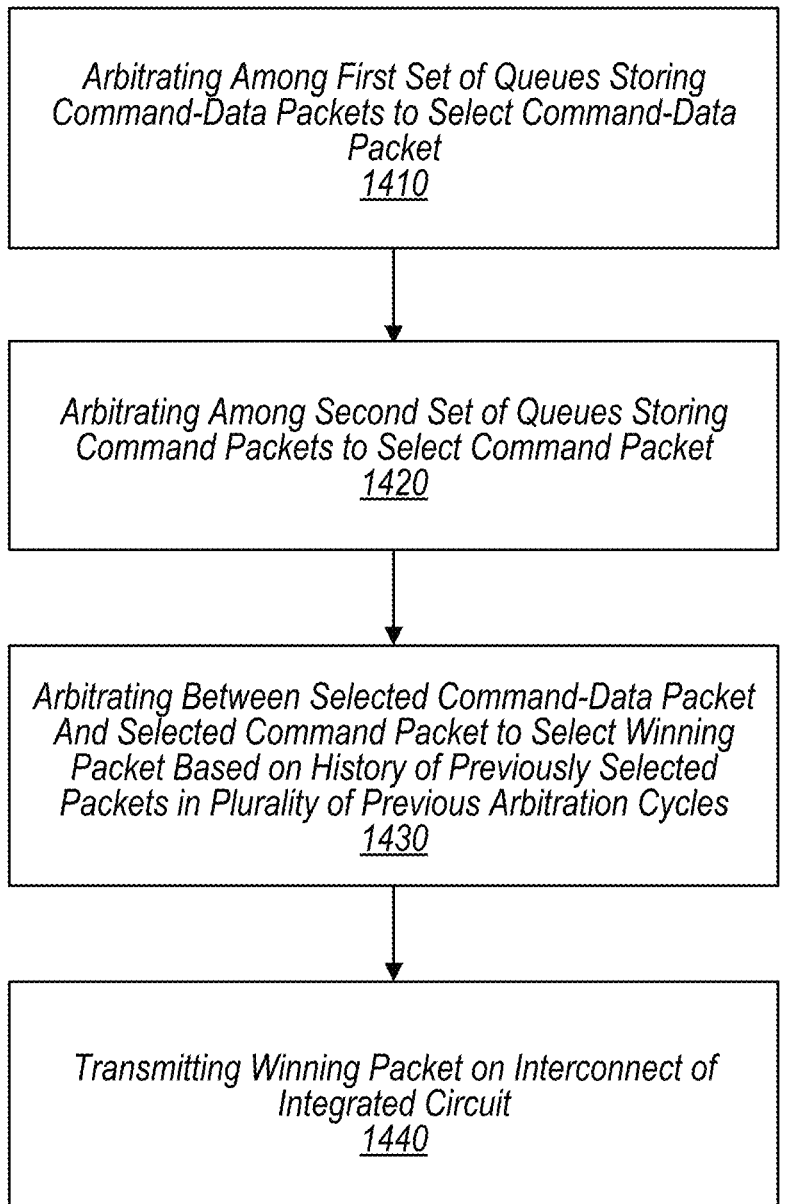

Arbitrating Among First Set of Queues Storing
Command-Data Packets to Select Command-Data
Packet
1410

Arbitrating Among Second Set of Queues Storing
Command Packets to Select Command Packet
1420

Arbitrating Between Selected Command-Data Packet
And Selected Command Packet to Select Winning
Packet Based on History of Previously Selected
Packets in Plurality of Previous Arbitration Cycles
1430

Transmitting Winning Packet on Interconnect of
Integrated Circuit
1440

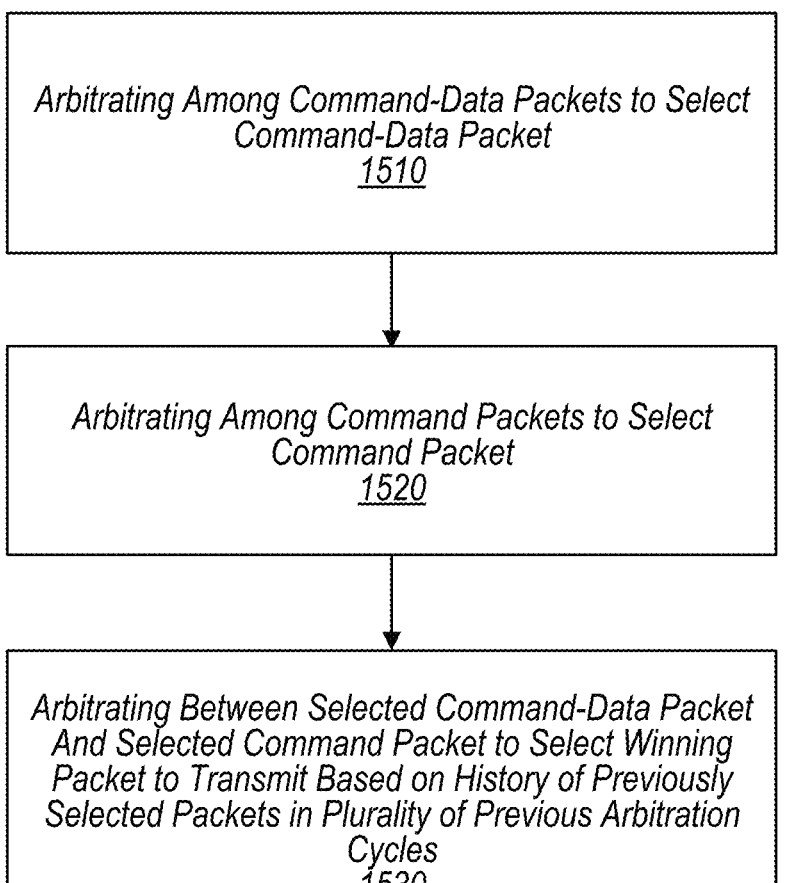

Arbitrating Among Command-Data Packets to Select Command-Data Packet
<u>1510</u>

Arbitrating Among Command Packets to Select Command Packet
<u>1520</u>

Arbitrating Between Selected Command-Data Packet And Selected Command Packet to Select Winning Packet to Transmit Based on History of Previously Selected Packets in Plurality of Previous Arbitration Cycles
<u>1530</u>

FIG. 15

MECHANISMS FOR ARBITRATING AMONG PACKETS IN HIERARCHICAL ARBITRATION ARCHITECTURE

BACKGROUND

Technical Field

This disclosure relates generally to integrated circuits and, more specifically, to various mechanisms to arbitrate between packets issued on a communication fabric by components of a system having one or more co-packaged integrated circuits.

Description of the Related Art

Modern computer systems often include a system on a chip (SOC) that integrates many computer components (e.g., a central processing unit (CPU), a graphics processing unit (GPU), etc.) onto an integrated circuit die or multiple co-packaged dies. The components are normally coupled to memory devices (e.g., random access memory) of those systems via a set of memory controllers and a set of communication fabrics/networks. The components often perform read and write transactions that involve accessing data from or writing data to the memory devices. Accordingly, the components can issue commands across a communication fabric to a memory controller to access or write data for a memory device. For read transactions, the components retrieve data without manipulating it, but for write transactions, those components manipulate the data and then write it back to one of the memory devices.

BRIEF DESCRIPTION OF THE DRAWINGS

FIG. 1 is a block diagram illustrating example elements of a system comprising multiple integrated circuit dies that are co-packaged in an integrated circuit assembly, according to some embodiments.

FIG. 9 is a table diagram illustrating an example scenario of arbitrating among packets based on counter values, according to some embodiments.

FIGS. 10-15 are flow diagrams illustrating example methods that pertain to arbitrating among packets to transmit on a communication fabric, according to some embodiments.

DETAILED DESCRIPTION

Figure 2:
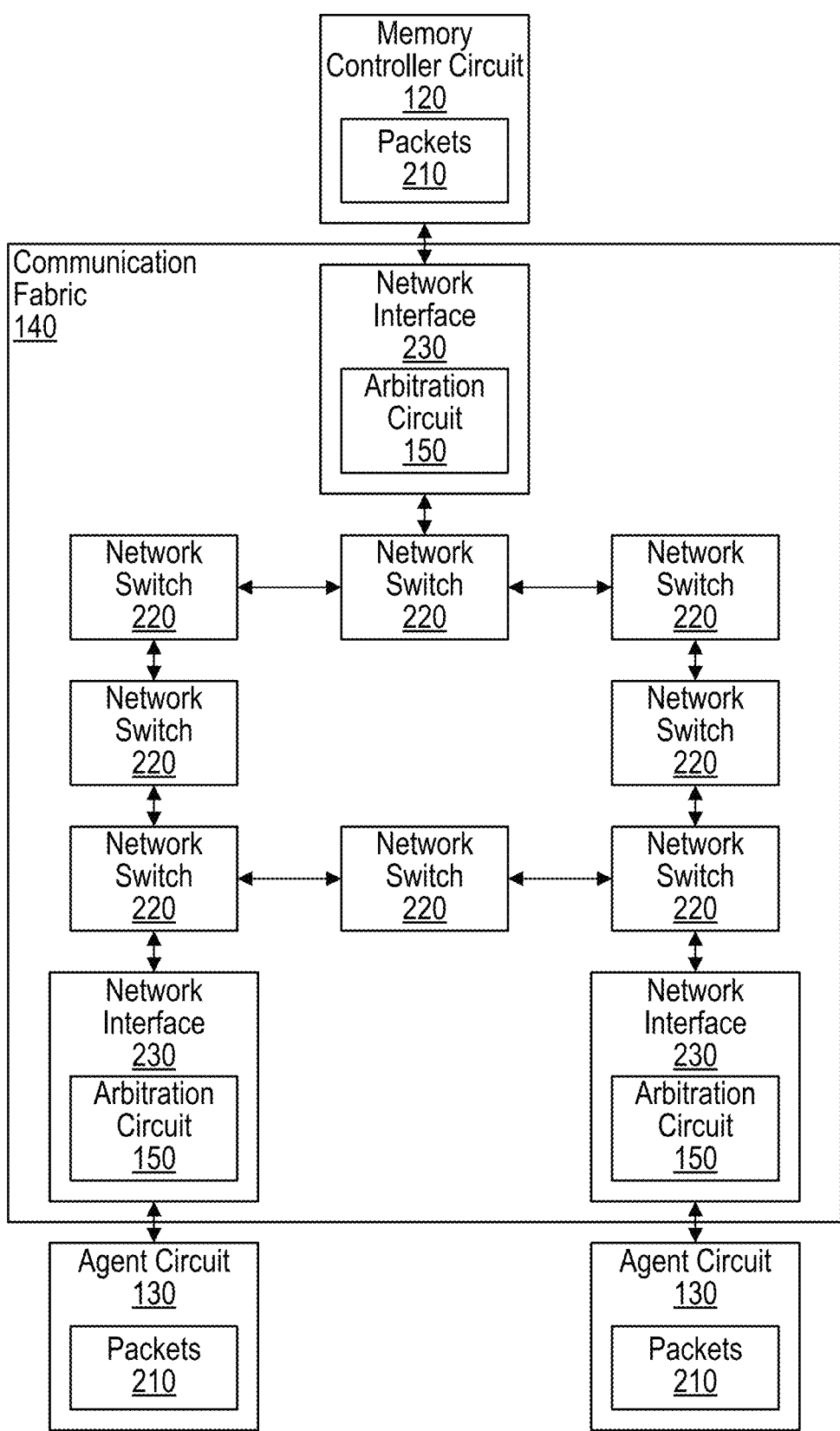
FIG. 2 is a block diagram illustrating example elements of a communication fabric that couples together various components, according to some embodiments.

Integrated circuits can include various components (e.g., CPUs, GPUs, etc.) coupled to together via a communication fabric/network that is used to route commands and data between the components. For example, a processor may implement a read transaction in which it issues a request to a memory controller to access data from a memory and receives a corresponding response containing the data. Individual communications that make up a given transaction are referred to as "packets"—the given transaction (e.g., read or write) may be made up of two or more packets transmitted between a source and a target via the communication fabric. Packets can be command (a command that does not have accompanying data) and command-data (a command that does have accompanying data). Due to physical limitations on the number of buses, queues, etc. of a communication fabric, the fabric can comprise arbitration circuits that arbitrate among packets to transmit through the fabric.

Arbitration circuits, in general, attempt to balance between a variety of competing goals when selecting among communications to be sent on a communication fabric. As an example, communications may be assigned to one of various virtual channels that share the same buses. A mechanism for fairly distributing the available bandwidth among the virtual channels while also respecting quality of service (QoS) guarantees on certain channels, priorities between the channels, etc. can be complicated. Moreover, it is desirable to maximize use of the bandwidth on the communication fabric in order to achieve a higher data transfer rate between components coupled to the fabric, which in turn increases the performance of those components. Arbitration circuits may implement a least recently granted (LRG) arbitration scheme, particularly among channels having the same QoS and/or priority. While such a scheme tends to allow for each channel to make progress at a reasonable rate, it may not always allow for maximized use of bandwidth. For example, an interconnect having a command bus and a data bus, where packets that comprise data require multiple transmission cycles (or "beats") on the data bus for each command beat, can be difficult to optimize. Ideally, command packets would be packed onto the command bus during transmission cycles in which the data of a previous command-data packet is being transmitted on the data bus, referred to as "packing."

But the LRG arbitration scheme is not designed to take into account such factors. These factors are particularly significant when the command and data buses are coupled, in which the data for a command-data packet is transmitted at a fixed time with respect to the corresponding command (e.g., the first beat can be transmitted at the same time as the command, or at a fixed offset from the transmission of a command). When data transmissions consume more beats of data bus than the corresponding commands consume on the command bus for a given packet, there is a minimum space between command-data packets that is based on the number of data beats. If a command-data packet uses one beat on the command bus and two beats on the data bus, the minimum spacing between command-data packets is two beats (i.e., every other beat). Similarly, command-only packets can have a desired minimum spacing to avoid overwhelming a target if they cause command-data packets at the target (e.g., a memory controller) receiving the command-only packets. In particular, a read transaction is a command packet from the source to the target (a read request) and a command-data packet from the target to the source (a read response command and data being returned). The read request takes a single beat while the read response takes multiple beats. Consequently, the source can overwhelm the target with read requests since a read response takes more beats than a read request. Thus, there may be a desired minimum spacing of the read request command-only packets to avoid overwhelming the target.

The above minimum spacing requirements can result in unused bubbles of bandwidth for certain traffic patterns. For example, if a write request with two data beats (although it can have more data beats) is selected by an arbitration circuit in cycle 0, and there is no read request available to pack with the write's data beat on cycle 1, then the cycle 1 arbitration is idle. On cycle 2, if there is both a read request and a write request with multiple data beats available, the LRG mechanism would select the read request. As the read request is command-only, the data bus for cycle 2 will be idle and a bubble has occurred on the data bus. If the write request had instead been selected on cycle 2, then, on cycle 3, the read request could be packed with the write data beat and there would be no bubbles on the data bus. Thus, LRG arbitration circuits do not maximize the use of the available bandwidth. This disclosure addresses, among other things, the problem of how to implement arbitration circuits that overcome at least some of the above deficiencies.

In various embodiments described below, a system includes one or more co-packaged integrated circuits having agent circuits configured to transmit, via a communication fabric of the system, command packets and command-data packets. The communication fabric includes network switches, at least one of which includes queues configured to store one or more of the packets and an arbitration circuit configured to arbitrate among packets stored in the queues to transmit on the communication fabric. The arbitration circuit may select a winning packet from one or more packets during a given arbitration cycle based on a history of previously selected packets. In various embodiments, the arbitration circuit selectively implements, in response to receiving a command packet and a command-data packet during a particular arbitration cycle and based on the frequencies of particular buses of the communication fabric, one of at least two different arbitration schemes to select the winning packet for that arbitration cycle when the immediately preceding arbitration cycle did not have a winning packet. After selecting the winning packet, the arbitration circuit may transmit it.

The different arbitration schemes may include an LRG scheme and a non-LRG scheme. When the immediately preceding arbitration cycle to an arbitration cycle had a winning packet, in various embodiments, the arbitration circuit implements the LRG scheme to select a winning packet for the arbitration cycle. But when the immediately preceding arbitration cycle has no winning packet, then in various embodiments, the arbitration circuit implements either the non-LRG scheme or the LRG scheme depending on a bus frequency difference between particular buses of the communication fabric and whether a packet was selected in the oldest preceding arbitration cycle in a fixed window of preceding arbitration cycles. The arbitration circuit may select, when implementing the non-LRG arbitration scheme, a packet of a particular type (e.g., a command packet) as the winning packet for the arbitration cycle based on the winning packet of the oldest preceding arbitration cycle being of the same type (e.g., another command packet).

The arbitration circuit may include two lower-level arbitration circuits that are coupled to a higher-level arbitration circuit. In various embodiments, the lower-level arbitration circuits select between command and command-data packets, respectively, to issue to the higher-level arbitration circuit to select the winning packet during a given arbitration cycle based on one of the different arbitration schemes. Command packets may be associated with multiple channels from which the first lower-level arbitration circuit arbitrates and also command-data packets may be associated with multiple channels from which the second lower-level arbitration circuit arbitrates. In order to allow for the packets of a given channel to make forward progress on the communication fabric, in various embodiments, the lower-level arbitration circuits implement a weighted arbitration scheme in which they arbitrate among their respective channels based on counter values and weight values associated with the channels. A packet of a given channel may be provided to the higher-level arbitration circuit based on the counter value of its channel being less than the counter values of the other channels. In response to sending that packet, the lower-level arbitration circuit may increment the counter value based on the weight value that is associated with the channel. While these lower-level arbitration circuits are discussed as implementing a weighted arbitration scheme, they may implement other arbitration schemes in other embodiments. For example, the lower-level arbitration circuits may implement a LRG arbitration scheme that does not involve weight values.

These techniques may be advantageous over prior approaches as these techniques better utilize the available bandwidth of a communication fabric. As discussed, bubbles on a data bus and a command bus can occur often under an arbitration circuit that implements only a LRG arbitration scheme. For example, if a write request with multiple data beats is selected by an LRG arbitration circuit in cycle 0, and there is no read request available to pack with the write's data on cycle 1, then the cycle 1 arbitration is idle. On cycle 2, if there is a read request and a write request with multiple data beats available, the LRG arbitration circuit would select the read request and thus the data bus for cycle 2 will be idle and a bubble has occurred on the data bus. In contrast, the arbitration circuit disclosed herein may select the write request on cycle 2 and the read request on cycle 3 and thus the data bus and the command bus can be fully utilized for both cycles. By better utilizing the available bandwidth of the communication fabric, components coupled to the communication fabric may be able to communicate more traffic in a more efficient manner. As a result, the operation of a computer system having the disclosed arbitration circuit is improved.

Turning now to FIG. 1, a block diagram of a system 100 is shown. System 100 includes a set of components that may be implemented via hardware or a combination of hardware and software. In various embodiments, system 100 is any hardware-based system such as a desktop computer, a laptop computer, a tablet computer, a cellular or mobile phone, etc. Examples of types of systems that may correspond to system 100 are discussed in more detail with respect to FIG. 17. In the illustrated embodiment, system 100 comprises an integrated circuit assembly 110 that is coupled to a memory 125A and a memory 125B and includes integrated circuit dies 115A and 115B. As further shown, integrated circuit dies 115A and 115B respectively include a memory controller circuit 120, a set of agent circuits 130, and a communication fabric 140 that couples those components together. Also as shown, communication fabrics 140 include a set of arbitration circuits 150. System 100 can be implemented differently than shown. As an example, system 100 may comprise one integrated circuit die 115. It is noted that the number of components of system 100 (and also the number of subcomponents for those shown in FIG. 1, such as agent circuits 130) may vary between embodiments. Accordingly, there can be more or fewer of each component or subcomponent than the number shown in FIG. 1.

Integrated circuit assembly 110, in various embodiments, integrates many components (e.g., memory controller circuits 120, agent circuits 130, etc.) onto multiple integrated circuit dies 115 that are integrated into a single package. Accordingly, integrated circuit assembly 110 may be a multi-die system in which the hardware hides the fact that there are multiple dies 115 from software (e.g., by ensuring latencies are low, keeping power states synchronized, etc.)- that is, integrated circuit dies 115 can be configured as a single system in which the existence of multiple dies is transparent to software executing on that system. But in some embodiments, the components of system 100 are implemented on two or more discrete chips in system 100. Integrated circuit assembly 110 may be a system on a chip (SOC). For the case of discussion, various embodiments in this disclosure are described as being implemented using one or more SoCs. But it is to be understood any disclosed SoC can also be implemented using a chiplet-based architecture. Thus, wherever the term "SoC" appears in this disclosure, those references are intended to suggest alternate embodiments in which the same functionality is implemented via a less monolithic architecture, such as via multiple chiplets/dies, which may be included in a single package.

Architectures in which there are multiple dies are to be understood to encompass both homogeneous designs (in which each die includes identical or almost identical functionality) and heterogeneous designs (in which the functionality of each die diverges more considerably). This disclosure further contemplates embodiments in which the functionality of multiple SoCs are implemented using different levels of discreteness. For example, the functionality of a first system could be implemented on a single IC, while the functionality of a second system (which could be the same or different than the first system) could be implemented using a number of co-packaged dies/chiplets.

Integrated circuit dies 115 (or simply "dies"), in various embodiments, are component packages that integrate one or more components (e.g., a memory controller circuit 120, one or more agent circuits 130, etc.) on respective semiconductor substrates—each die 115 can be an SOC. In some cases, dies 115A and 115B include the same set of hardware components printed on each chip and be referred to as symmetrical dies relative to each other. As used herein, the term "symmetrically similar" refers to dies that include the same component circuits, although the dies can be physically different due to manufacturing defects. The layout of the component circuits of symmetrically similar dies can also be different. For example, symmetrically similar dies 115 that are co-packaged together can have their component circuit layouts mirror each other. But dies that are asymmetrical to each other do not include the same component circuits. For example, dies 115A and 115B in the illustrated embodiment are asymmetrical to each other because die 115A includes an I/O agent circuit 132 and a CPU complex 134 for agent circuits 130, and die 115B does not include those components but includes GPU complexes 136A and 136B for agent circuits 130.

Memory controller circuits 120, in various embodiments, include circuitry configured to receive, from the other components, memory requests (e.g., load/store requests, instruction fetch requests, etc.) to perform memory operations, such as accessing and returning data from memory 125A and 125B. As depicted, memory controller circuits 120A and 120B are coupled to memory 125A and 125B, respectively, and therefore memory controller circuits 120A and B may process memory requests directed at memory 125A and 125B, respectively. In various embodiments, a component on one die 115 is able to issue requests to a component on another die 115. As an example, agent circuit 130A may issue a command packet to memory controller circuit 120B that includes a command requesting data from memory 125B. Memory 125A and 125B may thus be accessible to various components on integrated circuit dies 115A and 115B independent of which die 115 those components are located on.

Memory 125, in various embodiments, is usable to store data and program instructions that are executable by components of integrated circuit assembly 110 (e.g., CPU complex 134) to cause system 100 to implement operations described herein. Memory controller circuits 120 may be configured to access any type of memory 125. Memory 125 may be implemented using various physical memory media, such as hard disk storage, floppy disk storage, removable disk storage, flash memory, random access memory (RAM—SRAM, EDO RAM, SDRAM, DDR SDRAM, RAMBUS RAM, etc.), etc. Memory available to integrated circuit assembly 110, however, is not limited to primary storage. Rather, integrated circuit assembly 110 can also include other forms of storage such as cache memory (e.g., L1 cache, L2 cache, etc.) that may be found in agent circuits 130.

In various embodiments, memory controller circuits 120 include queues for storing and ordering memory operations that are to be sent to memory 125. Memory controller circuits 120 may further include data buffers to store write data awaiting to be written to memory 125 and read data awaiting to be returned to the source of a memory operation (e.g., agent circuits 130). In various embodiments, memory controller circuits 120 include components for maintaining cache coherency within integrated circuit assembly 110, including ones that track the location of cache lines of data within assembly 110. Accordingly, requests for cache lines of data can be routed through memory controller circuits 120A and 125B, which may access the data from agent circuits 130 and/or memory 125A and 125B, respectively. Also, in addition to accessing the data, memory controller circuits 120 may cause snoop requests to be issued to agent circuits 130. As a result, memory controller circuits 120 can cause those agent circuits 130 to invalidate and/or evict data from their caches to ensure coherency. As discussed in greater detail below, these various interactions between the components of integrated circuit assembly 110 can be facilitated via packets (command packets and command-data packets) that are issued between the components.

Agent circuits 130, in various embodiments, are circuits that implement functionality for agents within system 100. As used herein, an agent is any component or device that sources and/or sinks communications on one or more of communication fabrics 140. A source agent circuit 130 generates (sources) a communication while a destination agent circuit 130 receives (sinks) the communication. A given agent circuit 130 may be a source agent circuit for some communications and a destination agent circuit for other communications. As shown in FIG. 1, an agent circuit 130A includes an input/output circuit 132, an agent circuit 130B includes a CPU complex 134, and agent circuits 130C and 130D include GPU complexes 136A and 136B, respectively.

Input/Output (I/O) circuit 132, in various embodiments, includes circuitry configured to bridge peripherals 133 to one or more communication fabrics 140 and implement coherency mechanisms for processing transactions associated with peripherals 133. Transactions may be processed in a particular order relative to other transactions at I/O circuit 132. For example, a group of posted non-relaxed ordered transactions might be processed in the order in which the requests for the transactions are received at I/O circuit 132. I/O circuit 132 may receive requests from peripheral 133 to read and/or write data associated with memory 125A and/or 125B. As part of processing a request, I/O circuit 132 can communicate with memory controller circuits 120A and/or 120B to read or write data. Peripherals 133, in various embodiments, include sets of additional hardware functionality that may be included in integrated circuit assembly 110 or external to integrated circuit assembly 110. For example, peripherals 133 may include video peripherals (e.g., an image signal processor configured to process image capture data from a camera, GPUs, video encoder/decoders, scalers, rotators, blenders, display controllers, etc.), audio peripherals (e.g., microphones, speakers, interfaces to microphones and speakers, audio processors, digital signal processors, etc.), and also interface controllers for various interfaces external to assembly 110 (e.g., Universal Serial Bus (USB), peripheral component interconnect (PCI) including PCI Express, serial and parallel ports, etc.). As further examples, peripherals 133 may include networking peripherals such as media access controllers (MACs).

CPU complex 134, in various embodiments, includes a set of processors that serve as a CPU of integrated circuit assembly 110. A processor may include any circuitry or microcode that is configured to execute instructions defined in an instruction set architecture implemented by the processor. The processors may encompass discrete microprocessors, processors and/or microprocessors integrated into multichip module implementations, processors implemented as multiple integrated circuits, etc. CPU complex 134 may include a single processor, multiple processors (e.g., 16, 24, 32, etc.), or clusters of processors. A processor may execute the main control software of system 100, such as an operating system. Generally, software executed by CPU complex 134 during use control the other components of system 100 to realize the desired functionality of system 100. Processors may also execute other software, such as an application programs that may provide user functionality and rely on the operating system for lower-level device control, scheduling, memory management, etc. Thus, processors of CPU complex 134 may be referred to as application processors.

CPU complex 134 may include other hardware such as an L2 cache and/or an interface to the other components of system 100 (e.g. an interface to communication fabric 140A). In various embodiments, processors of CPU complex 134 share a common last level cache (e.g., an L2 cache) while including their own caches (e.g., an L0 cache, an L1 cache, etc.) for storing instructions and data. A processor may fetch instructions and data from memory 125A and/or 125B as a part of executing load instructions and store the fetched instructions and data within caches of CPU complex 134. The processors may retrieve instructions and data (e.g., from the caches) and execute those instructions (e.g., conditional branch instructions, ALU instructions, etc.) to perform operations involving the retrieved data. The processors may then write a result of the operations back to memory 125A and/or 125B.

GPU complexes 136, in various embodiments, each include a set of graphics processors that serve as a GPU of integrated circuit assembly 110. GPU complexes 136 may each include a single graphics processor, multiple graphics processors, or clusters of graphics processors, and GPU complexes 136 may each include a different, respective number of graphics processors. A graphics processor may receive graphics-oriented instructions, such as OPENGL®, Metal®, or DIRECT3D® instructions, for example. A graphics processor may execute specialized GPU instructions or perform other operations based on the received graphics-oriented instructions. A graphics processor may generally be configured to process large blocks of data in parallel and build images in a frame buffer for output to a display, which may be part of system 100 or may be a separate device. A graphics processor may include transform, lighting, triangle, and rendering engines in one or more graphics processing pipelines. A graphics processor may also output pixel information for display images. A graphics processor, in various embodiments, may include programmable shader circuitry which may include highly parallel execution cores configured to execute graphics programs that can include pixel tasks, vertex tasks, and compute tasks (which may or may not be graphics-related).

Communication fabrics 140, in various embodiments, are interconnects that facilitate communication among the components of integrated circuit assembly 110. For example, fabric 140A enables agent circuit 130A to send a request to memory controller circuit 120A for data stored at memory 125A and receive that data. Communication fabrics 140 may implement any type of communication interconnect and protocol for communicating among the components that are coupled to fabrics 140. In various embodiments, communication fabrics 140 are packet-based and hierarchical with bridges, cross bar, point-to-point, or other interconnects. In some embodiments, communication fabrics 140 are bus-based, including shared bus configurations, cross bar configurations, and hierarchical buses with bridges. Communication fabrics 140 may implement different topologies. In some embodiments, communication fabrics 140 implement ring topologies in which its network switches form a ring such that any network switch may reach any other network switch in the ring by transmitting a communication on the ring in the direction of the other network switch. In some embodiments, fabrics 140 implement double ring topologies in which there are multiple communication paths (e.g., one path used to send requests in a clockwise direction among components and another path used to send requests in a counterclockwise direction). The term "communication fabric" can be used interchangeably with the terms "communication network" and "interconnect." A ring topology is discussed in more detail with respect to FIG. 2.

Communications fabrics 140 can be connected via a die-to-die (D2D) interface. A D2D interface, in various embodiments, extends networks and buses of dies 115 between dies 115 such that those networks and buses can function as a single unified fabric topology connecting dies 115 together. The D2D interface may include various signals that are asserted/driven by sender blocks on one die 115 and received by the corresponding receiver blocks on another die 115. Communications fabrics 140 can be connected via a general-purpose input/output (GPIO) interface. A GPIO interface, in various embodiments, includes a set of signal pins on one die 115 that are connected to a corresponding set of signal pins on another die 115. Those signal pins may be set up to accept or source different logic voltages and thus can be used to perform digital input and output functions. Accordingly, a component of die 115A may use a signal pin of the GPIO interface to assert a signal that can be detected by a component of die 115B (or vice versa), where that signal may be used to indicate a request or an acknowledgement. By being connected together via one or more interfaces, communications fabrics 140 may permit components of one die 115 (e.g., agent circuit 130B) to issue requests to read and/or write data at a memory 125 coupled to another die 115 (e.g., memory 125B).

In various embodiments, communications issued across communication fabrics 140 are transmitted as packets. Packets can be command-only packets that include a command without data or command-data packets that include a command and accompanying data. Transactions can be made up of two or more packets (e.g., a request and the corresponding response). Due to physical limitations on the number of buses of fabrics 140, fabrics 140 include arbitration circuits 150 that arbitrate between packets to select a winning packet to make forward progress on the respective fabric 140.

An arbitration circuit 150, in various embodiments, includes circuitry that is configured to arbitrate between packets to select a winning packet to transmit on a communication fabric 140 during a given arbitration cycle. An arbitration circuit 150 may select the winning packet based on a history of previously selected packets. As discussed in more detail with respect to FIG. 4, an arbitration circuit 150 can comprise two lower-level arbitration circuits coupled to a higher-level arbitration circuit. One of the lower-level arbitration circuits may arbitrate among command packets to select a command packet to provide to the higher-level arbitration circuit while the other lower-level arbitration circuit arbitrates among command-data packets to select a command-data packet to provide to the higher-level arbitration circuit. As discussed in more detail with respect to FIG. 5, the higher-level arbitration circuit may selectively implement one of at least two different arbitration schemes to select a winning packet for the given arbitration cycle. The higher-level arbitration circuit may selectively implement one of the schemes when an immediately preceding attribution cycle has no winning packet. An example table showing how the winning packet can be selected is discussed in more detail with respect to FIG. 6. After selecting a winning packet, an arbitration circuit 150 may then transmit that winning packet on a command bus and/or a data bus of the associated fabric 140.

Turning now to FIG. 2, a block diagram of example elements of a communication fabric 140 that is coupled to various components is shown. In the illustrated embodiment, there is a memory controller circuit 120 and two agent circuits 130 that are coupled to communication fabric 140. As shown, communication fabric 140 includes multiple network interfaces 230 that are coupled to network switches 220 that form a ring. Also as shown, network interfaces 230 include respective arbitration circuits 150. The illustrated embodiment may be implemented differently than shown. For example, network switches 220 may form a mesh, a double ring, etc While arbitration circuits 150 are illustrated and discussed as being a part of network interfaces 230, arbitration circuits 150 may be implemented at any arbitration point involving command and command-data packets. For example, arbitration circuits 150 may be located in network switches 220 that combine traffic from multiple inputs (e.g., a network switch 220 coupled to another network switch 220 and a network interface 230). Arbitration circuits 150 may also be located in agent circuits 130, memory controller circuits 120, and/or buses between coupled dies 115.

A network switch 220, in various embodiments, is a circuit that is configured to receive communications on a network and forward the communications on the network in the direction of the destination of the communication. For example, a packet 210 sourced by one of the agent circuits 130 can be issued to memory controller circuit 120 that controls a memory 125 that is mapped to an address of that packet 210. A packet 210 may be a command packet having a command without accompanying data or a command-data packet having a command and accompanying data. Packets 210 can be transmitted via fabric 140, where the packet format may include an indication of a virtual channel and a subchannel that a packet is travelling in (discussed in more detail with respect to FIG. 7), a memory address, source and destination agent identifiers, data (if appropriate), etc.

Multiple packets 210 may form a transaction. In various embodiments, a transaction is a complete communication between a source agent and a target agent. For example, a read transaction may include a read request packet 210 from the source agent to the target agent, one or more coherence message packets 210 among caching agents and the target agent and/or source agent if the transaction is coherent, a data response packet 210 from the target agent to the source agent, and possibly a completion packet 210 from the source agent to the target agent, depending on the protocol. A write transaction may include a write request packet 210 from the source agent to the target agent, one or more coherence message packets 210 as with the read transaction if the transaction is coherent, and possibly a completion packet 210 from the target agent to the source agent. The write data may be included in the write request packet 210 or transmitted in a separate write data packet 210 from the source agent to the target agent, in some embodiments.

Network switches 220 can form different topologies. In the illustrated embodiment, network switches 220 form a ring in which each network switch 220 is connected to two other network switches 220 such that any network switch 220 may reach any other network switch 220 in the ring by transmitting a communication (e.g., a packet 210) in the direction of the other network switch 220. A communication may thus pass through one or more intermediate network switches 220 in the ring to reach the targeted network switch 220. When a network switch 220 receives a communication from an adjacent network switch 220, the network switch 220 may examine the communication to determine if a component (e.g., memory controller circuit 120, an agent circuit 130, etc.) to which the network switch 220 is coupled is the destination of that communication. If so, the network switch 220 may forward the communication to the component (e.g., via the network interface 230 coupled to the component). If not, the network switch 220 may forward the communication to the next network switch 220 (i.e., the other network switch 220 adjacent to the network switch 220 and not the adjacent network switch 220 from which the network switch 220 received the communication). As used herein, the term "adjacent network switch" refers to a network switch 220 to which another given network switch 220 can directly send a communication, without the communication traveling through intermediate network switches 220.

Accordingly, in various embodiments, when an agent circuit 130 issues a packet 210 to memory controller circuit 120 (for example), that packet 210 traverses around the ring (by being transmitted by network switches 220) until it reaches memory controller circuit 120 or it is transmitted to another network (e.g., to another communication fabric 140, which may be a part of another die 115). In the illustrated embodiment, the ring is bi-directional and therefore a request packet 210 and a response packet 210 may traverse the same network switches 220 (e.g., the request packet 210 moves counterclockwise while the response packet 210 moves clockwise through a set of network switches 220). But the ring may be unidirectional. In some embodiments, network switches 220 form two rings: one that allows for packets 210 to traverse counterclockwise and one that allows for packets 210 to traverse clockwise.

A network interface 230, in various embodiments, is a circuit configured to bridge a component (e.g., an agent circuit 130) to communication fabric 140. A network interface 230 may include serializer/reserialized (SERDES) circuits that can be used to communicate across the boundary between communication fabric 140 and an agent circuit 130/memory controller circuit 120. Accordingly, while not shown in FIG. 2, a network interface 230 may be included in an agent circuit 130/memory controller circuit 120 that is coupled to a network interface 230 on fabric 140. A network interface 230 may include sufficient routing storage (e.g., queues) and logic (e.g., an arbitration circuit 150) for managing the routing of packets 210. Thus, as a component coupled to a network interface 230 issues packets 210 to the network interface 230, the network interface 230 may arbitrate among those packets 210 (using its arbitration circuit 150) to select packets 210 to provide to the network switch 220 that is coupled to that network interface 230.

Figure 3:
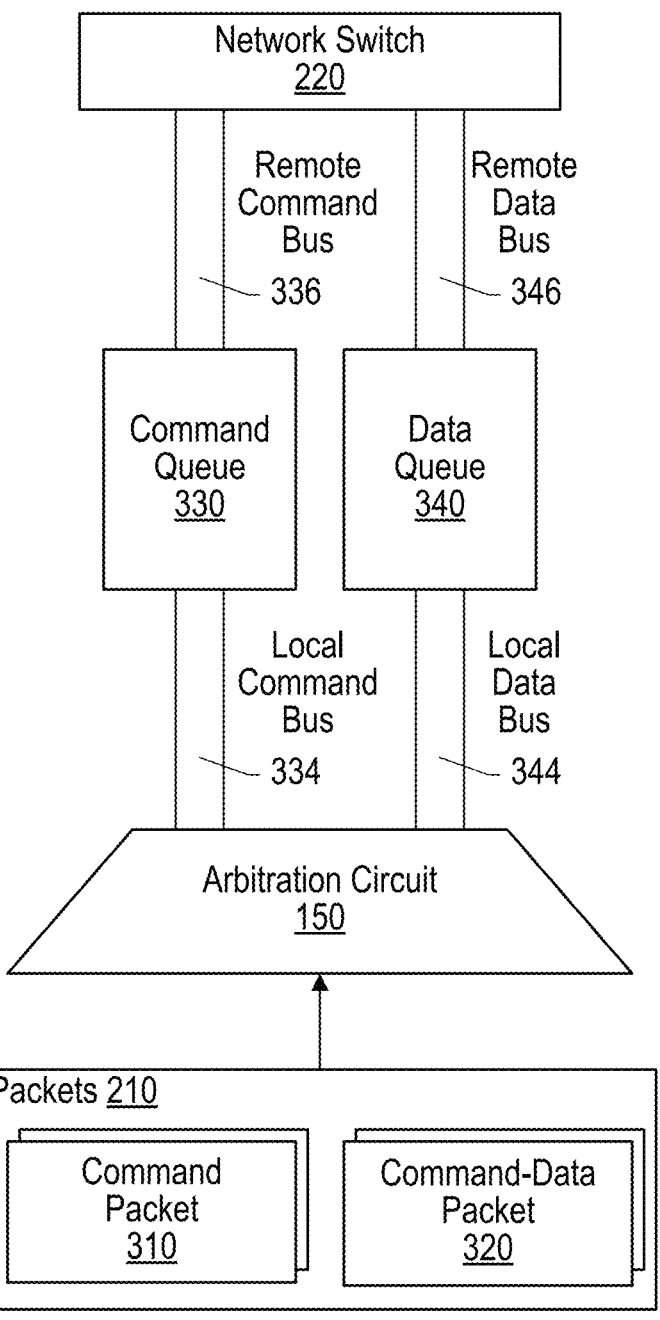
FIG. 3 is a block diagram illustrating an arbitration circuit configured to arbitrate among packets to transmit on buses of a communication fabric, according to some embodiments.

Turning now to FIG. 3, a block diagram of an example layout that includes an arbitration circuit 150 configured to arbitrate among packets 210 to transmit on buses of a communication fabric 140 is shown. In the illustrated embodiment, there is arbitration circuit 150, a network switch 220, a command queue 330, a data queue 340, a local command bus 334, a local data bus 344, a remote command bus 336, and a remote data bus 346. Also as shown, packets 210 comprise command packets 310 and command-data packets 320. The illustrated embodiment may be implemented differently than shown. For example, there might be multiple command queues 330 and/or data queues 340.

Command queue 330, in various embodiments, is a circuit configured to store a set of commands (e.g., read commands to read data and write commands to write data) of command packets 310 and command-data packets 320. Command queue 330 may comprise one or more buffers or one or more linked list structures that implement an ordering protocol (e.g., a first in, first out protocol) that preserves the ordering of the commands within command queue 330. For example, a PCI-e-based transaction might involve issuing multiple commands (i.e., PCI-e memory requests) to a PCI-e component that have to be completed in a certain order. Command queue 330 may preserve that order using a linked list structure that ensures that the commands are released in a manner that preserves the order. In various embodiments, there are multiple command queues 330 that store different types of commands—e.g., one command queue 330 can store DRAM requests while another command queue 330 stores snoop responses. Network switch 220 may be configured to control the flow of commands from command queues 330 by selecting from which commands to forward.

Data queue 340, in various embodiments, is a circuit configured to store data included in command-data packets 320. That data may be data that is being written to a memory 125 or data read from a memory 125. Data queue 340 may also comprise one or more buffers or one or more linked list structures that implement an ordering protocol that preserves the ordering of the data within data queue 340. Similarly to command queues 330, there may be multiple data queues 340, and network switch 220 may further be configured to control the flow of data from data queues 340.

Local command bus 334 and local data bus 344, in various embodiments, are buses that allow for commands and data to be transmitted from arbitration circuit 150 to command queue 330 and data queue 340. Local command bus 334 and local data bus 344 may be considered a part of arbitration circuit 150 and operate at the same or similar frequency as arbitration circuit 150. Remote command bus 336 and remote data bus 346, in various embodiments, are buses that allow for commands and data to be transmitted from command queue 330 and data queue 340 to network switch 220. Remote command bus 336 and remote data bus 346 may operate at a similar or different frequency to arbitration circuit 150. In various embodiments, local command bus 334 and local data bus 344 are coupled buses and remote command bus 336 and remote data bus 346 are coupled buses in which the data for a command-data packet 320 is transmitted at a fixed time with respect to the corresponding command (e.g., the first beat can be transmitted at the same time as the command, or at a fixed offset from the transmission of a command). But, in some embodiments, these buses are non-coupled in which commands and data travel in parallel, at different times, without any synchronization between them.

When arbitration circuit 150 arbitrates among packets 210 and selects a command-data packet 320 as the winning packet 210 for an arbitration cycle, in various embodiments, it transmits, during that cycle or a subsequent cycle, a portion of the data of the command-data packet 320 on local data bus 344 to data queue 340 and the command on local command bus 334 to command queue 330. (In some embodiments, arbitration circuit 150 transmits the entire data of that command-data packet 320 in one cycle.) During the subsequent cycle, arbitration circuit 150 may transmit the remaining data of the command-data packet 320 (if that packet 320 involves two data beats) on local data bus 344 to data queue 340. If a command packet 310 is available during that subsequent cycle, in various embodiments, then arbitration circuit 150 transmits the command of that command packet 310 on local command bus 334 to command queue 330. Thus, data of a command-data packet 320 and a command of a command packet 310 may be forwarded across local command bus 334 and local data bus 344 within the same cycle. But if a command packet 310 is not available during that subsequent cycle, then local command bus 334 may not be used for that cycle.

When arbitration circuit 150 selects a command packet 310 as the winning packet 210 for an arbitration cycle, in various embodiments, arbitration circuit 150 transmits, during that cycle or a subsequent cycle, the command of the command packet 310 on local command bus 334 to command queue 330. If there was a winning command-data packet 320 in a previous arbitration cycle and there is still remaining data to be sent for that packet 320, then local data bus 344 may also be used, otherwise, local data bus 344 may not be used for that cycle in which the command of the command packet 310 is forwarded. As discussed in more detail with respect to FIG. 5, local command bus 334 and local data bus 344 may operate at relatively the same frequency as remote command bus 336 and remote data bus 346. But in some cases, local command bus 334 and local data bus 344 operate at a relatively different frequency to remote command bus 336 and remote data bus 346. Arbitration circuit 150 may implement a particular one of multiple arbitration schemes for selecting the winning packet 210 based on whether there is a frequency difference between these two pairs of busses. For example, if remote buses 336 and 346 are operating at a slower frequency than local buses 334 and 344, then arbitration circuit 150 may implement a non-LRG arbitration scheme.

Arbitration circuit 150 may be an upstream arbitration circuit (i.e., passes packets 210 from a source to the target) or a downstream arbitration circuit (i.e., passes packets 210 from the target back to the source). In the case of arbitration circuit 150 being an upstream arbitration circuit, command packets 310 may be associated with read requests and command-data packets 320 may be associated with write requests. In the case of being a downstream arbitration circuit, command packets 310 may be associated with write responses and command-data packets 320 may be associated with read responses.

Figure 4:
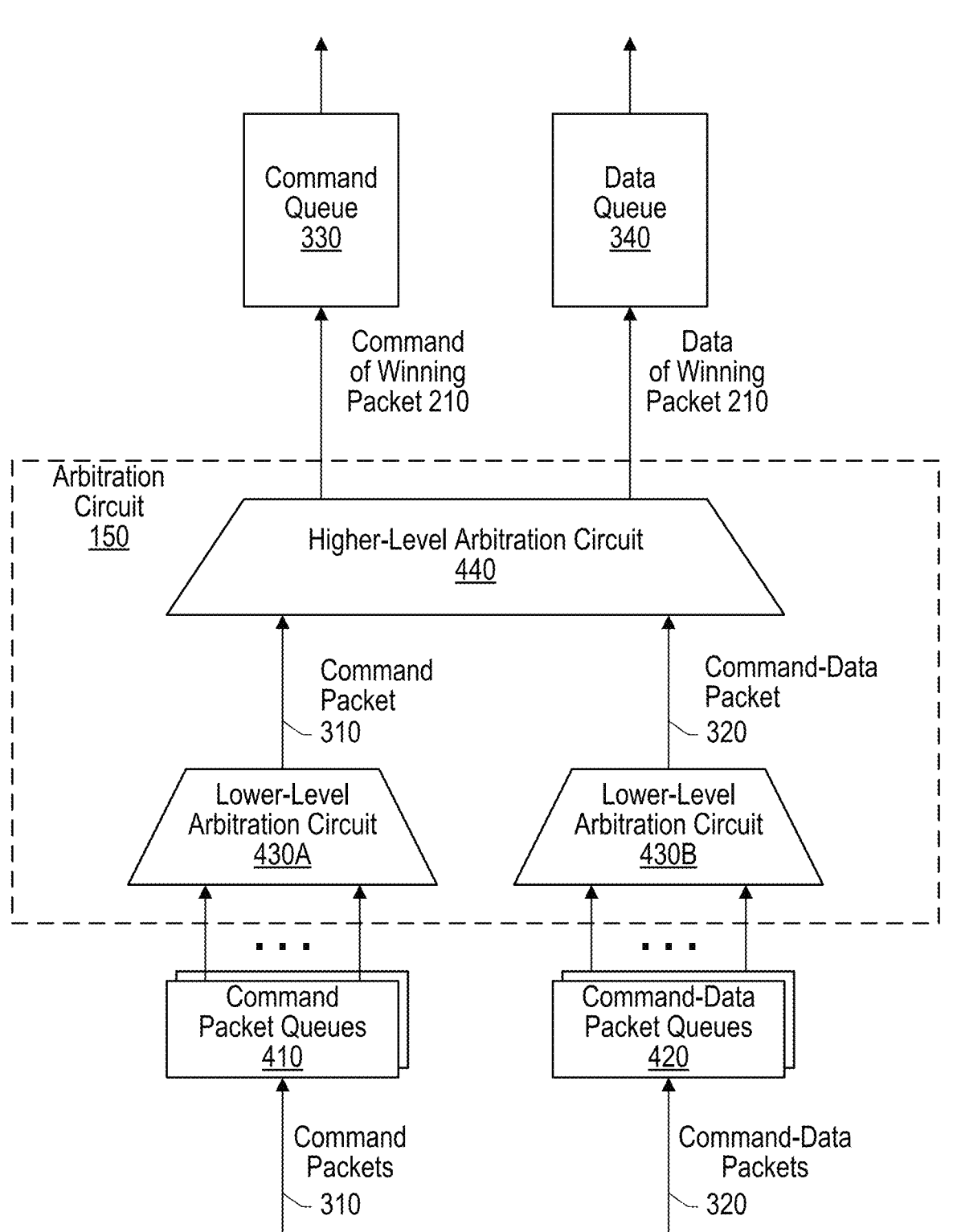
FIG. 4 is a block diagram illustrating example elements of an arbitration circuit having a hierarchical structure comprising a higher-level arbitration circuit and lower-level arbitration circuits, according to some embodiments.

Turning now to FIG. 4, a block diagram of an example arbitration circuit 150 having a hierarchical structure is shown. In the illustrated embodiment, arbitration circuit 150 is coupled to a command queue 330, a data queue 340, command packet queues 410, and command-data packet queues 420. As shown, arbitration circuit 150 includes a higher-level arbitration circuit 440 that is coupled to lower-level arbitration circuits 430A and 430B. In some embodiments, arbitration circuit 150 is implemented differently than shown. For example, arbitration circuit 150 may not include lower-level arbitration circuits 430A and 430B.

In various embodiments, command packet queues 410 are circuits configured to store command packets 310 and, likewise, command-data packet queues 420 are circuits configured to store command-data packets 320. Queues 410 and 420 may comprise one or more buffers or one or more linked list structures that implement an ordering protocol (e.g., a first in, first out protocol) that preserves the ordering of commands within queues 410 and 420 (and/or data in the case of command-data packet queues 420). As discussed in more detail with respect to FIG. 7, command packet queues 410 can correspond to different virtual channels and command-data packet queues 420 can also correspond to different virtual channels. Queues 410 and 420 may also store different types of commands—e.g., one command queue 410 can store DRAM requests while another command queue 410 stores snoop responses.

Lower-level arbitration circuits 430, in various embodiments, are circuits configured to arbitrate among packets of the same group (i.e., command packets 310 or command-data packets 320). Accordingly, in the illustrated embodiment, lower-level arbitration circuit 430A arbitrates among command packets 310 stored in command packet queues 410 and lower-level arbitration circuit 430B arbitrates among command-data packets 320 stored in command-data packet queues 420. In some embodiments, lower-level arbitration circuits 430 arbitrate among packets 210 that are grouped differently. As an example, a lower-level arbitration circuit 430 may arbitrate between command packets 310 and command-data packets 320 associated with the same virtual channel (e.g., low-latency transactions). Since there may be more than two groups in some embodiments, there may be more than two lower-level arbitration circuits 430. If a lower-level arbitration circuit 430 selects a winning packet in an arbitration cycle, it may provide that packet to higher-level arbitration circuit 440. In various embodiments, higher-level arbitration circuit 440 receives, for a given arbitration cycle, at most one command packet 310 and at most one command-data packet 320 from lower-level arbitration circuits 340A and 340B.

The inclusion of lower-level arbitration circuits 430 in arbitration circuit 150 may help to prevent packet-selection distortion in which packets 210 of a first transaction type (e.g., bulk) are over selected/prioritized relative to packets 210 of a second transaction type (e.g., real time). That is, this packet-selection distortion issue may be resolved by using a hierarchical arbiter in which packets 210 of the same group (e.g., command) but in different virtual channels are arbitrated by lower-level arbitration circuits 430 using a weighted LRG arbitration scheme and the winners of those arbitrations are arbitrated by higher-level arbitration circuit 440 using the arbitration schemes discussed in more detail with respect to FIGS. 5 and 6.

Figure 5:
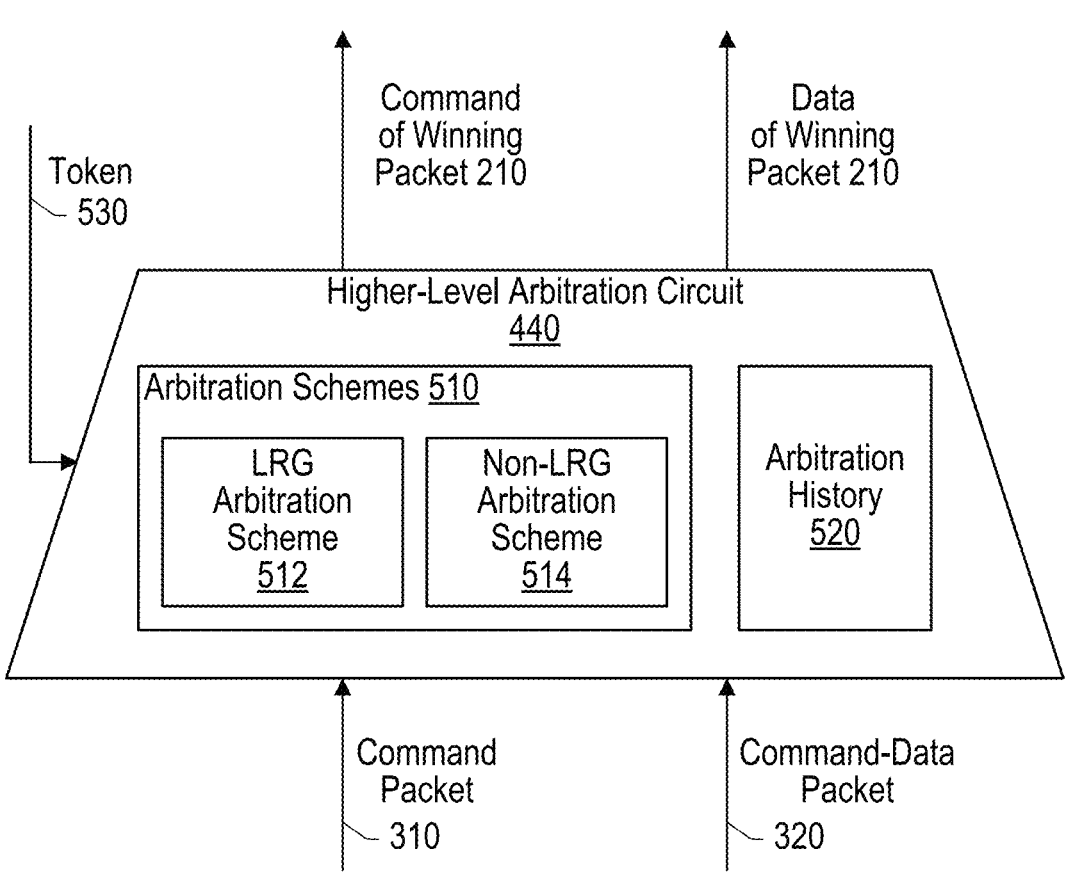
FIG. 5 is a block diagram illustrating example elements of a higher-level arbitration circuit configured to arbitrate among packets based on different arbitration schemes, according to some embodiments.

Turning now to FIG. 5, a block diagram of an example higher-level arbitration circuit 440 is shown. In the illustrated embodiment, higher-level arbitration circuit 440 implements arbitration schemes 510 and includes arbitration history 520. As shown, arbitration schemes 510 include a least-recently-used (LRG) arbitration scheme 512 and a non-LRG arbitration scheme 514. The illustrated embodiment may be implemented differently than shown—e.g., arbitration schemes 510 may include additional arbitration schemes.

Arbitration schemes 510, in various embodiments, are schemes for arbitrating between packets 210 to select a winning packet 210 to forward to the next component (e.g., a network switch 220) in the communication path between a source and a target. As depicted, arbitration schemes 510 include LRG arbitration scheme 512 and non-LRG arbitration scheme 514. These arbitration schemes 510 may be implemented for cases in which higher-level arbitration circuit 440 receives a command packet 310 and a command-data packet 320 in the same arbitration cycle. LRG arbitration scheme 512, in various embodiments, is a scheme in which higher-level arbitration circuit 440 selects, as the winning packet 210 for an arbitration cycle, a packet 210 of the opposite type to the last winning packet 210. For example, if the last winning packet 210 was a command packet 310, then higher-level arbitration circuit 440 selects a command-data packet 320. Non-LRG arbitration scheme 514, in various embodiments, is a scheme in which higher-level arbitration circuit 440 may not select, as the winning packet 210 for an arbitration cycle, a packet 210 of the opposite type to the last winning packet 210 but instead may select a packet 210 of the same type to the last winning packet 210. Whether higher-level arbitration circuit 440 implements LRG arbitration scheme 512 or non-LRG arbitration scheme 514 may depend on a history of previously selected packets 210 and a frequency difference between the local buses (e.g., local buses 334 and 344) and remote buses (e.g., remote buses 336 and 346) associated with arbitration circuit 150.

Arbitration history 520, in various embodiments, is history information that identifies the winning packets 210 for a set of previous arbitration cycles (e.g., the previous five cycles). Arbitration history 520 may not identify a winning packet 210 for a particular arbitration cycle if the cycle had no winning packet 210. After selecting a winning packet 210 or detecting that there is no winning packet 210 (e.g., because no packets 210 were received) for an arbitration cycle, higher-level arbitration circuit 440 may then update arbitration history 520 to identify the outcome for that arbitration cycle. In various embodiments, higher-level arbitration circuit 440 includes circuitry, such as a ring buffer, configured to store and provide arbitration history 520 to, e.g., circuitry that is configured to implement arbitration schemes 510. Accordingly, in various embodiments, higher-level arbitration circuit 440 accesses arbitration history 520 for a given arbitration cycle and may use it to determine which arbitration scheme 510 to use to select the winning packet 210 for the arbitration cycle.

Token 530, in various embodiments, is a construct that represents buffer space on the other side of a connection and can be used for flow control. For example, a component on the "receiving" side of a connection (e.g., a network switch 220 receiving a packet 210 from a network interface 230) may make tokens 530 available that indicate that it has available space to store packets 210. Accordingly, when another components sends a packet 210 to the former component, a token 530 is consumed. Once the space has been reclaimed, the token 530 may be made available again. In various embodiments, tokens 530 control which arbitration scheme 510 is used by higher-level arbitration circuit 440 for certain scenarios that occur when a command packet 310 and a command-data packet 320 are received in the same arbitration cycle.

Selecting between arbitration schemes 510 may work well when arbitration circuit 150 (which can include local buses 334 and 344) is operating at the same or similar frequency to remote buses 336 and 346. But in some cases, arbitration circuit 150 may operate at a higher frequency than remote buses 336 and 346—the frequency drop may occur across queues 330 and 340. When arbitration circuit 150 is operating at a higher frequency, using non-LRG arbitration scheme 514 may result in back pressure and therefore it may be desirable to utilize only LRG arbitration scheme 512 as it may result in a more optimized output pattern from queues 330 and 340 when there is a frequency difference. In various embodiments, whether a token 530 is available can be indicative of whether there is a frequency difference (or more particularly, whether arbitration circuit 150/local buses 334 and 344 are operating at a higher frequency than remote buses 336 and 346). When arbitration circuit 150 operates at a higher frequency than the component on the other side of the connection, it may consume tokens 530 at a quicker rate than the other component can make them available. Accordingly, when a token 530 is not available, higher-level arbitration circuit 440 may not select between schemes 512 and 514 but instead may implement only LRG arbitration scheme 512 as that scheme may produce a more optimized input pattern for the other component.

Figure 6:
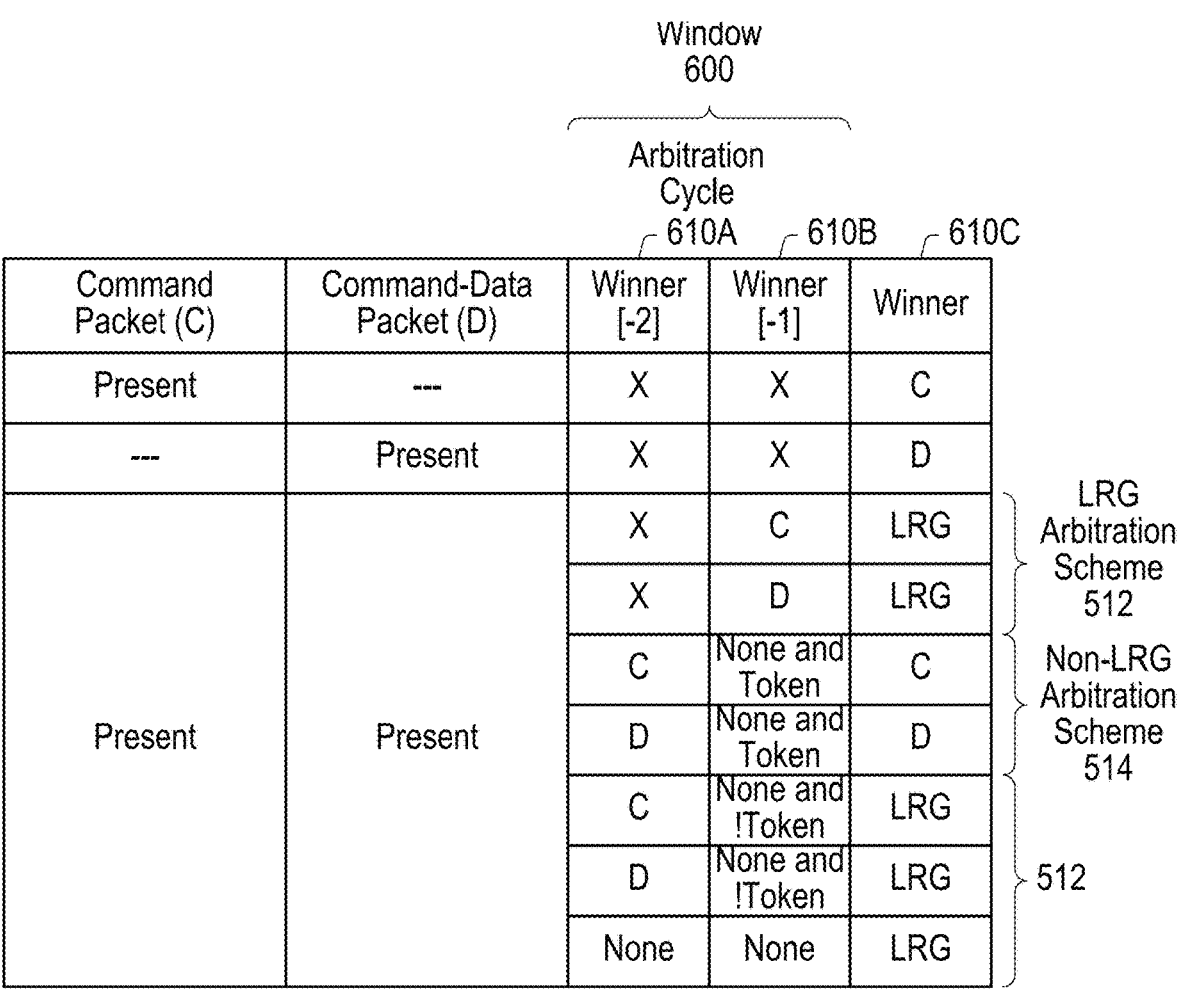
FIG. 6 is a table diagram illustrating example outcomes under different arbitration schemes for different scenarios, according to some embodiments.

Turning now to FIG. 6, a table diagram of the outcomes under arbitration schemes 510 for different scenarios in which a command packet 310 and/or a command-data packet 320 are present in an arbitration cycle 610 is shown. As discussed, higher-level arbitration circuit 440 arbitrates among one or more packets during an arbitration cycle 610 to select a winning packet 210. That selection may be based on a fixed window 600 of preceding arbitration cycles 610—information about the preceding arbitration cycles 610 (e.g., whether there was a winner, which packet type won, etc.) identified in arbitration history 520. In FIG. 6, fixed window 600 contains preceding arbitration cycles 610A and

610B that precede the current arbitration cycle 610C. While fixed window 600 contains two preceding arbitration cycles 610 in FIG. 6, fixed window 600 may contain more or fewer preceding arbitration cycles 610 (e.g., three preceding arbitration cycles 610) in other embodiments.

When only a command packet 310 or a command-data packet 320 is present in arbitration cycle 610C (the current arbitration cycle), in various embodiments, higher-level arbitration circuit 440 selects that present packet as the winning packet independent of the outcomes of preceding arbitration cycles 610. Accordingly, as shown in the first two scenario rows, higher-level arbitration circuit 440 selects a command packet 310 when only a command packet 310 is present in arbitration cycle 610C and selects a command-data packet 320 when only a command-data packet 320 is present in arbitration cycle 610C. When both a command packet 310 and a command-data packet 320 are present in arbitration cycle 610C and there was a winning packet in the immediately preceding arbitration cycle 610B, in various embodiment, higher-level arbitration circuit 440 selects the LRG packet as the winning packet, as shown in the third and fourth scenario rows. For example, if a command packet 310 won in arbitration cycle 610B, then higher-level arbitration circuit 440 selects the present command-data packet 320 as the winning packet in arbitration cycle 610C.

But when the immediately preceding arbitration cycle 610B does not have a winning packet, higher-level arbitration circuit 440 may implement either LRG arbitration scheme 512 or non-LRG arbitration scheme 514 based on whether a token 530 is available and whether the oldest preceding arbitration cycle 610 in fixed window 600 (i.e., arbitration cycle 610A in FIG. 6) had a winning packet. If a token 530 is available (which may indicate that local buses 334 and 344 are operating at the same, similar, or lower frequency to remote buses 336 and 346) and the oldest preceding arbitration cycle 610 within fixed window 600 had a winning packet, then, in various embodiments, higher-level arbitration circuit 440 selects the packet having the same type as the winning packet in the oldest preceding arbitration cycle 610, as shown in the fifth and sixth scenario rows. For example, when implementing non-LRG arbitration scheme 514, higher-level arbitration circuit 440 may select a command-data packet 320 as the winning packet for arbitration cycle 610C based on the packet of arbitration cycle 610A being another command-data packet 320. In some instances, when the winning packet of the oldest preceding arbitration cycle 610 in fixed window 600 is a command packet 310, higher-level arbitration circuit 440 may select a command-data packet 320 as the winning packet for arbitration cycle 610C if higher-level arbitration circuit 440 is downstream.

But if a token 530 is not available (which may indicate that local buses 334 and 344 are operating at higher frequency to remote buses 336 and 346) and the oldest preceding arbitration cycle 610 had a winning packet, then, in various embodiments, higher-level arbitration circuit 440 implements LRG arbitration scheme 512 and selects the LRG packet as the winning packet for arbitration cycle 610C, as shown in the seventh and eighth scenario rows. In some instances, none of the arbitration cycles 610 within fixed window 600 have a winning packet and thus, in various embodiments, higher-level arbitration circuit 440 implements LRG arbitration scheme 512 and selects the LRG packet as the winning packet for arbitration cycle 610C, as shown in the ninth scenario row. Instead of implementing LRG arbitration scheme 512 for the scenario in which none of the preceding arbitration cycles 610 within fixed window 600 have a winning packet, in some embodiments, the winning packet is selected based on whether higher-level arbitration circuit 440 is upstream or downstream. For example, a command packet 310 may be selected when higher-level arbitration circuit 440 is upstream and a command-data packet 320 may be selected when higher-level arbitration circuit 440 is downstream.

Figure 7:
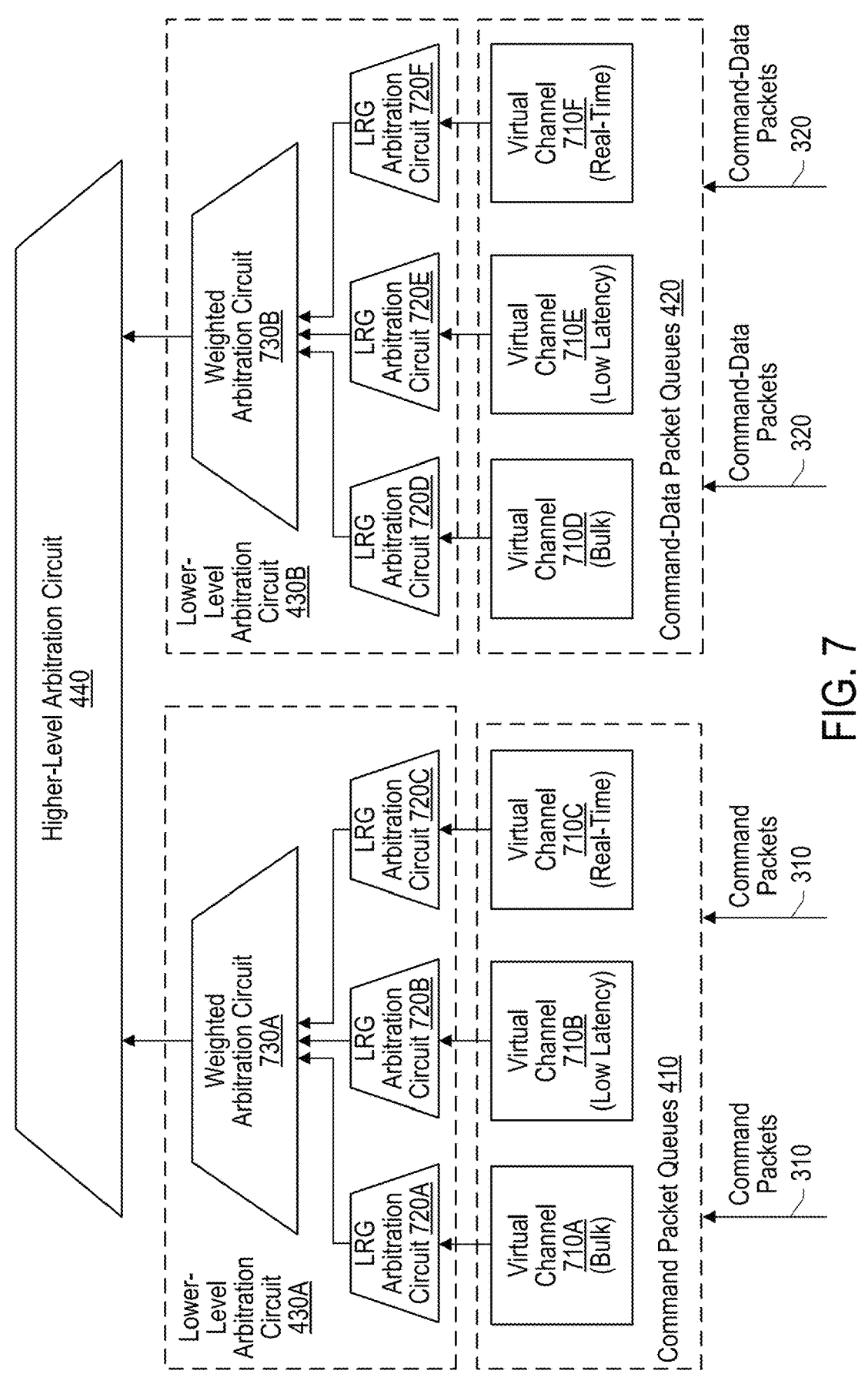
FIG. 7 is a block diagram illustrating example elements of lower-level arbitration circuits configured to arbitrate among packets of different virtual channels, according to some embodiments.

Turning now to FIG. 7, a block diagram of an example layout that includes lower-level arbitration circuits 430 configured to arbitrate among packets 210 of different virtual channels is shown. In the illustrated embodiment, there are command packet queues 410 and command-data packet queues 420 coupled respectively to lower-level arbitration circuits 430A and 430B that are coupled to higher-level arbitration circuit 440. Also as shown, command packet queues 410 facilitate virtual channels 710A-C and command-data packet queues 420 facilitate virtual channels 710D-F. As illustrated, lower-level arbitration circuit 430A includes LRG arbitration circuits 720A-C coupled to virtual channels 710A-C and a weighted arbitration circuit 730A, and lower-level arbitration circuit 430B includes LRG arbitration circuits 720D-F coupled to virtual channels 710D-F and a weighted arbitration circuit 730B. The illustrated embodiment may be implemented differently than shown. For example, lower-level arbitration circuits 430 may not include LRG arbitration circuits 720 in some embodiments in which virtual channels 710 do not support subchannels and/or multiple input legs.

While lower-level arbitration circuits 430A and 430B are shown as including weighted arbitration circuits, they may include other types of arbitration circuits in other embodiments. For example, lower-level arbitration circuits 430A and 430B may include a LRG arbitration circuit (instead of a weighted arbitration circuit 730) that does not use weight values to arbitrate among packets or a round-robin arbitration circuit that arbitrates among packets using a round-robin scheme. Accordingly, the hierarchical structure of arbitration circuit 150 is not limited to an implementation in which lower-level arbitration circuits 430 include weighted arbitration circuits 730 and/or LRG arbitration circuits 720.

In various embodiments, agent circuits 130 generate transactions with different latency and/or bandwidth requirements. These transactions may be classified into different quality-of-service classes. These classes may include real-time, low-latency, and best-effort (referred to as "bulk")—there may be additional classes. In various embodiments, real-time traffic covers traffic streams that require guaranteed bandwidth over defined windows of time with bounded latency. Failure to satisfy these requirements may lead to user-visible error conditions such as display underrun or frame loss. In various embodiments, low-latency traffic covers relatively low bandwidth traffic streams with high sensitivity to latency. System 100 may prioritize low-latency traffic to give it low latency while constraining its bandwidth to avoid interference with other virtual channels 710. In various embodiments, bulk traffic covers all traffic streams that do not fall into one of the above classes. In various embodiments, communication fabrics 140 support multiple virtual channels 710 for separating traffic belonging to different classes as defined by their corresponding latency and bandwidth requirements.

Virtual channels 710, in various embodiments, are channels associated with the classes above and that physically share a network (e.g., a communication fabric 140) but are logically independent on the network such that communications in one virtual channel 710 do not block progress of communications in another virtual channel 710. As shown, virtual channels 710A and 710D are associated with bulk traffic, virtual channels 710B and 710E are associated with low-latency traffic, and virtual channels 710C and 710F are associated with real-time traffic. Components of the network (e.g., a network switch 220, a network interface 230, etc.) may employ resources dedicated to each virtual channel 710 (e.g., buffers, queues, or linked lists in a queue) so that communications on the virtual channels 710 remain logically independent. As an example, buffers may be employed at each stopping point (e.g., network switch 220) along a channel from source to target/destination so that there might be buffer space for a packet 210 in a given channel 710 unless that channel 710 is blocked. As shown, command packet queues 410 store command packets 310 for virtual channels 710A-C and command-data packet queues 420 store command-data packets 320 for virtual channels 710D-F.

Arbitration schemes (e.g., a weighted arbitration scheme) may be used that permit any virtual channel 710 to bypass another virtual channel 710 if that other channel 710 is unable to transmit a packet 210 to the next stopping point. Consequently, if a given virtual channel 710 is not able to make forward progress due to congestion within its channel, other virtual channels 710 are not affected and can continue to make forward progress even though they are all being transported over the same physical channel.

In various embodiments, virtual channels 710 include subchannels. As discussed, each memory transaction may involve an exchange of a series of packets 210 between agent circuits 130 and memory controller circuits 120. Packets 210 belonging to different transactions that are associated with the same class (e.g., real-time) may potentially create a deadlock if there is a cyclic dependency such that a packet 210 belonging to one transaction cannot make forward progress until a packet 210 of another transaction makes forward progress or vice-versa. Thus, virtual channels 710 may include subchannels that are logically independent such that packets 210 in one subchannel channel do not block progress of packets 210 in another subchannel. As a result, the aforementioned deadlock may be avoided.

LRG arbitration circuits 720, in various embodiments, are circuits that are configured to arbitrate, based on an LRG arbitration scheme, among subchannels of virtual channels 710 (and/or input legs) to select a packet 210 to provide their respective weighted arbitration circuit 730. For example, virtual channel 710A might include two subchannels that store command packets 310 for bulk transactions. LRG arbitration circuit 720A may arbitrate between those subchannels and select, from the least-recently-granted one, a command packet 310 to provide to weighted arbitration circuit 730A. By using an LRG arbitration scheme, an LRG arbitration circuit 720 may allow for packets 210 of the different subchannels of a virtual channel 710 to make forward progress in a fair manner.

Weighted arbitration circuits 730, in various embodiments, are circuits configured to arbitrate between virtual channels 710 to select a winning packet 210 to provide to higher-level arbitration circuit 440. In particular, a weighted arbitration circuit 730 may arbitrate between packets 210 provided by the LRG arbitration circuits 720 coupled to that weighted arbitration circuit 730. As shown, weighted arbitration circuit 730A arbitrates between command packets 310 provided by LRG arbitration circuits 720A-C that correspond to virtual channels 710A-C, and weighted arbitration circuit 730B arbitrates between command-data packets 320 provided by LRG arbitration circuits 720D-F that correspond to virtual channels 710D-F. As discussed in greater detail with respect to FIG. 8, weighted arbitration circuits 730 may arbitrate between virtual channels 710 based on counter values and weight values assigned to the virtual channels 710. Weighted arbitration circuit 730A may arbitrate between virtual channels 710A-C based on a first set of counter values and a first set of weight values associated with virtual channels 710A-C, and weighted arbitration circuit 730B may arbitrate between virtual channels 710D-F based on a second set of counter values and a second set of weight values associated with virtual channels 710D-F. By using counter values and weight values, weighted arbitration circuits 730 may allow for packets 210 of different virtual channels 710 to make progress while respecting the latency and/or bandwidth requirements associated with the discussed classes.

Figure 8:
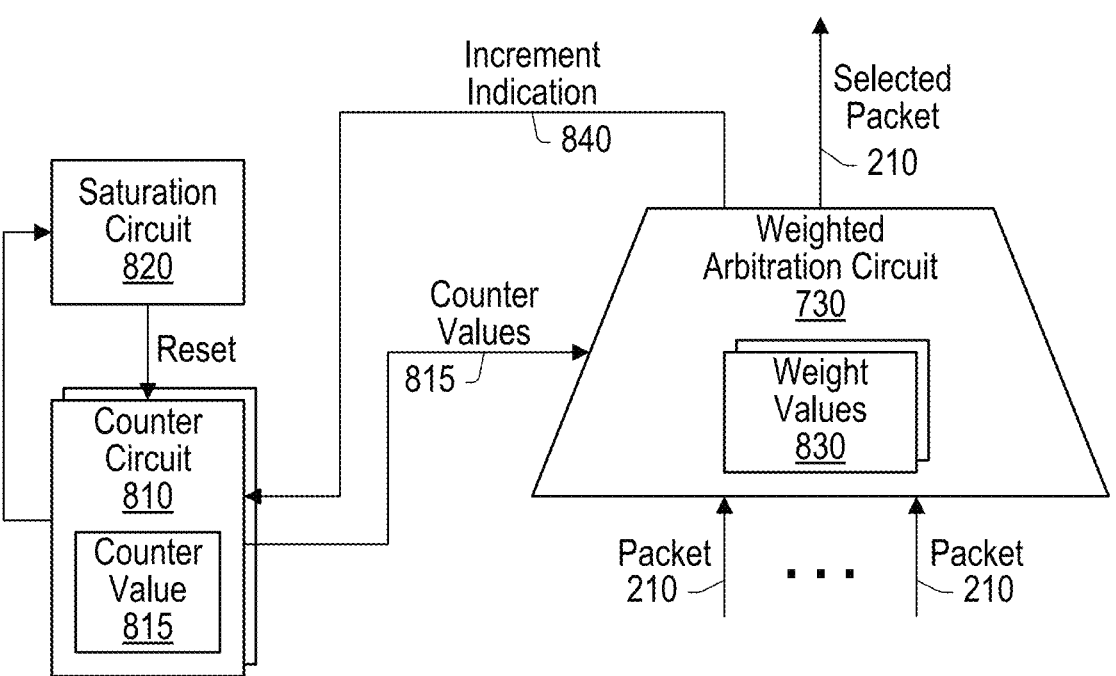
FIG. 8 is a block diagram illustrating example elements of a weighted least-recently-granted (LRG) arbitration circuit that is configured to arbitrate among packets based on weight values and counter values, according to some embodiments.

Turning now to FIG. 8, a block diagram of example elements of a weighted arbitration circuit 730 configured to arbitrate among packets 210 based on counter values 815 and weight values 830 is shown. In the illustrated embodiment, there is weighted arbitration circuit 730, a set of counter circuits 810, and a saturation circuit 820. The illustrated embodiment may be implemented differently than shown. As an example, weighted arbitration circuit 730 may not utilize counter values 815 when arbitrating among packets 210.

A counter circuit 810, in various embodiments, is a circuit that is configured to maintain (e.g., increment, reset, etc.) a counter value 815 that may correspond to a virtual channel 710. In various embodiments, when a packet 210 of a virtual channel 710 is selected as the wining packet by weighted arbitration circuit 730 for an arbitration cycle, weighted arbitration circuit 730 provides an increment indication 840 to the counter circuit 810 associated with that virtual channel 710 and thus the associated counter value 815 is incremented-in some embodiments, the counter value 815 is decremented. Counter values 815 can be provided to saturation circuit 820 to check for the occurrence of a saturation event—e.g., one or more of counter values 815 may be provided after one of them has been incremented/decremented.

The terms "increment" and "decrement" can be understood to encompass their common meanings, which as applied to a counter value respectively connote addition to and subtraction of a value (e.g., 1) from the counter value. It is contemplated, however, that equivalent counter behavior could be implemented using different arithmetic operations. For example, a counter could be implemented using negative values (e.g., 2's complement binary integers) such that "incrementing" the counter could involve subtraction rather than addition, and "decrementing" the counter could involve addition rather than subtraction. Accordingly, the terms "increment" and "decrement" should be understood to more generally encompass activities that respectively move a counter away from and towards an initial value (e.g., 0), regardless of whether the direction of counter movement is positive or negative.

Saturation circuit 820, in various embodiments, is a circuit configured to determine if any of a set of counter values 815 have reached a saturation threshold value. Saturation circuit 820 may determine that a given counter value 815 has reached a saturation threshold value if that counter value 815 is greater than (or equal to, in some cases) the saturation threshold value. The saturation threshold value may be the same for all counter values 815 or different for each counter value 815 or group of counter values (e.g., all counter values 815 for virtual channels 710 of the same packet type). For example, virtual channels 710 storing command packets 310 may share the same saturation threshold value (e.g., 24). As counter values 815 for those virtual channels 710 are incremented, saturation circuit 820 may detect that at least one of the counter values 815 has reached the saturation threshold value. In response to detecting the occurrence of a saturation event, in various embodiments, saturation circuit 820 instructs counter circuits 810 to reset one or more counter values 815 to an initial/default value (e.g., 0). In various cases, all counter values 815 of the same group may be reset. For example, all counter values 815 of virtual channels 710 storing command packets 310 may be reset to a default value based on a detection that at least one of their counter values 815 satisfies a saturation threshold value, and all counter values 815 of virtual channels 710 storing command-data packets 320 may be reset to a default value based on a detection that at least one of their counter values 815 satisfies the same or a different saturation threshold value. In some cases, all counter values 815 are reset, or only the particular counter value 815 that reached its saturation threshold value. An example of resetting counter values 815 is discussed in more detail with respect to FIG. 9.

As discussed, weighted arbitration circuit 730 may arbitrate between virtual channels 710 to select a packet 210 based on counter values 815 and weight values 830. Weight values 830, in various embodiments, are values associated with virtual channels 710 that determine the amount by which a virtual channel's counter value 815 is incremented. Weight values 830 may be set based on the virtual channel's class (e.g., bulk)-that is, based on the requirements (e.g., bandwidth and/or latency) of the virtual channel's class. In some cases, the subchannels of a virtual channel 710 are associated with their own weight values 830. While weight values 830 are discussed as being associated with virtual channels 710, in some embodiments, weight values 830 are associated with another element (e.g., queues 410/420, components of another grouping of packets 210, etc.).

When packets 210 are received by weighted arbitration circuit 730 for multiple virtual channels 710, in various embodiments, weighted arbitration circuit 730 selects the packet 210 of the virtual channel 710 whose counter value 815 is the lowest for those virtual channels 710. Weighted arbitration circuit 730 may then cause that counter value 815 to be incremented by that virtual channel's weight value 830. Multiple virtual channels 710 may have counter values 815 that are the same. Accordingly, in various embodiments, weighted arbitration circuit 730 selects the packet 210 based on weight values 830. As an example, weighted arbitration circuit 730 may select the packet 210 from the virtual channel 710 whose associated weight value 830 is the greatest among the virtual channels 710 from which a packet 210 has been received. In some cases, weighted arbitration circuit 730 may select the packet 210 randomly or in a round robin manner or based on LRG. Weighted arbitration circuit 730 may cause the counter value 815 of the winning virtual channel 710 to be incremented by that virtual channel's weight value 830.

In various embodiments, weight values 830 are different between virtual channels 710. For example, a bulk virtual channel 710 can be associated with a greater weight value 830 than a real-time virtual channel 710. Since the bulk virtual channel's weight value 830 is greater in this example and since weighted arbitration circuit 730 may select the packet 210 of the virtual channel 710 whose counter value 815 is the lowest, packets 210 are selected from the real-time virtual channel 710 more often than the bulk virtual channel 710. As such, a virtual channel's weight value 830 may be inversely proportional to the number of times that the virtual channel 710 will win arbitration at weighted arbitration circuit 730. Accordingly, virtual channels 710 with stricter bandwidth and/or latency requirements may be associated with weight values 830 having smaller values that are less than other virtual channels 710. Values 830 may also differ between virtual channels 710 of the same class but associated with different packet types—e.g., a bulk virtual channel 710 storing command packets 310 can be associated with a different weight 830 than a bulk virtual channel 710 storing command-data packets 320.

Turning now to FIG. 9, a table diagram of an example of arbitrating between packets 210 of virtual channels 710 based on counter values 815 is shown. The illustrated example involves arbitrating among a bulk virtual channel 710, a low-latency virtual channel 710, and a real-time virtual channel 710. For this example, bulk virtual channel 710 is associated with a weight value 830 of 4, low-latency virtual channel 710 is associated with a weight value 830 of 2, and real-time virtual channel 710 is associated with a weight value 830 of 1. Since these virtual channels 710 are associated with different weight values 830, their counter values 815 are incremented by different amounts. These virtual channels 710 may be associated with command packets 310 or command-data packets 320—e.g., this example may be implemented by weighted arbitration circuit 730A and/or 730B with their respective virtual channels 710. Countr values 815 are initially set to 0, and packets 210 are received for each virtual channel 710 during each arbitration cycle for this example.

During the first illustrated arbitration cycle, a weighted arbitration circuit 730 detects that counter values 815 for the illustrated virtual channels 710 are the same value. The weighted arbitration circuit 730 selects a packet 210 from bulk virtual channel 710. Bulk virtual channel 710 may be selected because it's weight value 830 is greater than the weight values 830 of the other virtual channel 710. During the second arbitration cycle, the weighted arbitration circuit 730 detects that the counter values 815 for low-latency virtual channel 710 and real-time virtual channel 710 are the same value and also less than the counter value 815 of bulk virtual channel 710. The weighted arbitration circuit 730 selects a packet 210 from low-latency virtual channel 710 and increments its counter value 815 by its weight value 830. During the third and fourth arbitration cycles, the weighted arbitration circuit 730 detects that real-time virtual channel 710 has the lowest counter value 815 for both cycle and thus selects the packet 210 from real-time virtual channel 710 for both cycles and increments its counter value 815 in both cycles by its weight value 830.

This process continues until the fifteenth arbitration cycle. In the fifteenth arbitration cycle, bulk virtual channel 710 wins and its counter value 815 is incremented. As a result, its counter value 815 satisfies (e.g., equal to or greater than) a saturation threshold value (e.g., 10 or 12). Accordingly, the counter values 815 of the three virtual channels 710 are reset to 0. In some embodiments, only the counter value 815 satisfying the saturation threshold value is reset to the initial value. The sixteenth arbitration cycle (not shown) may have a similar result to the first arbitration cycle in which bulk virtual channel 710. By resetting the counter values 815, system 100 may prevent a virtual channel 710 from being blocked/not winning for many cycles under certain conditions. For example, there may be periods in which traffic is being received for only one of the virtual channels 710 being arbitrated between and thus, without a reset, the counter value 815 of that virtual channel 710 may become distant in value from counter values 815 of the other virtual channels 710. As a result, when traffic is being received from multiple virtual channels 710 (including that virtual channel 710), it may not be selected for many cycles until the other counter values 815 catch up. The bandwidth and/or latency requirements of that virtual channel 710 may not be met.

Turning now to FIG. 10, a flow diagram of a method 1000 is shown. Method 1000 is one embodiment of a method performed by a system (e.g., system 100) to arbitrate among packets (e.g., packets 210) to transmit on a communication fabric (e.g., a communication fabric 140). Method 1000 can include more or fewer steps than shown. For example, method 1000 may include steps in which the system receives only a command-data packet or a command packet and transmits the received packet as a winning packet on the communication fabric.

Method 1000 begins in step 1010 with the system receiving a command-data packet (e.g., a command-data packet 320) and a command packet (e.g., a command packet 310). In various embodiments, the system comprises one or more co-packaged integrated circuits that include a plurality of agent circuits (e.g., agent circuits 130A-D). The plurality of agent circuits may include a central processing circuit (e.g., a CPU complex 134) having a set of processor circuits and a graphics processing unit (e.g., a GPU complex 136) having a set of graphics processor circuits. The plurality of agent circuits may further include a memory controller circuit (e.g., a memory controller circuit 120) that is configured to couple to a memory (e.g., a memory 125). The system may further include a communication fabric that is coupled to ones of the plurality of agent circuits and includes a plurality of network interface circuits (e.g., network interfaces 230). In various embodiments, the agent circuits are configured to transmit, via the communication fabric, packets, including particular packets to read and write data with respect to the memory. A particular one of the plurality of network interface circuit may include a plurality of queues (e.g., command packet queues 410 and command-data packet queues 420) configured to store ones of the packets, including command-data and command packets.

In some embodiments, the plurality of queues includes a first set of queues configured to store the command-data packets in association with a first set of virtual channels (e.g., virtual channels 710D-F) and a second set of queues configured to store the command packets in association with a second set of virtual channels (e.g., virtual channels 710A-C). The system may include a first lower-level arbitration circuit that is configured to arbitrate among the first set of queues to provide a command-data packet to a higher-level arbitration circuit and a second lower-level arbitration circuit that is configured to arbitrate among the second set of queues to provide a command packet to the higher-level arbitration circuit.

In step 1020, the system selectively implements, based on frequencies of a plurality of buses (e.g., local command bus 334, local data bus 344, remote command bus 336, and remote data bus 346) of the communication fabric, one of at least two different arbitration schemes to select a winning packet for a particular arbitration cycle (e.g., arbitration cycle 610C) when an immediately preceding attribution cycle (e.g., arbitration cycle 610B) has no winning packet. In various embodiments, the system includes an arbitration circuit that is configured to arbitrate among packets stored in the plurality of queues to transmit on the communication fabric and thus to select a winning packet from the received command packet and command-data packet during the particular arbitration cycle based on a history of previously selected packets. The arbitration circuit may be configured to receive, for an arbitration cycle, at most one command-data packet from the first lower-level arbitration circuit and at most one command packet from the second lower-level arbitration circuit. In some cases the arbitration circuit is an upstream arbitration circuit and thus the command-data packets are associated with write requests and the command packets are associated with read requests. The system may include an upstream arbitration circuit that is configured to arbitrate among other command-data packets and other command packets to transmit on the communication fabric. The other command-data packets may be associated with read responses and the other command packets may be associated with write responses.

In various embodiments, the at least two different arbitration schemes include an LRG arbitration scheme (e.g., LRG arbitration scheme 512) and a non-LRG arbitration scheme (e.g., non-LRG arbitration scheme 514). The arbitration circuit may be configured to implement the LRG arbitration scheme to select the winning packet for the particular arbitration cycle based on the immediately preceding arbitration cycle having no winning packet and a detection that a frequency difference between at least two buses of the plurality of buses satisfies a difference threshold. The arbitration circuit may be configured to implement the LRG arbitration scheme to select the winning packet for the particular arbitration cycle based on an indication that the immediately preceding arbitration cycle has a winning packet. The arbitration circuit may be configured to implement the non-LRG arbitration scheme to select the winning packet for the particular arbitration cycle based on the immediately preceding arbitration cycle having no winning packet, a detection that the frequency difference does not satisfy the difference threshold, and a detection that a packet was selected in an oldest preceding arbitration cycle within a fixed window of preceding arbitration cycles. The arbitration circuit may select, when implementing the non-LRG arbitration scheme, a command-data packet as the winning packet for the particular arbitration cycle based on the packet of the oldest preceding arbitration cycle within the fixed window being another command-data packet.

In step 1030, the system transmits the winning packet on the communication fabric. The communication fabric may include a command bus (e.g., local command bus 334 and/or remote command bus 336) configured to transmit commands and a data bus (e.g., local data bus 344 and/or remote data bus 346) configured to transmit data of command-data packets. In various embodiments, the arbitration circuit is configured to transmit, during a same cycle, a first portion of data of a particular command-data packet on the data bus and a command of the particular command-data packet on the command bus. In some cases, the first portion of data and the command are sent at a fixed distanced cycle from each other (e.g., the first portion of data may be sent one cycle after the command). The arbitration circuit may be configured to transmit, during a subsequent cycle to the same cycle, a second portion of the data of the particular command-data packet on the data bus and a command of a command packet on the command bus. The second portion of data and the command may be sent at the fixed distanced cycle (e.g., one cycle apart)—for coupled buses, there can be a fixed clock skew between a command and a correlating data beat being sent on the coupled buses.

Turning now to FIG. 11, a flow diagram of a method 1100 is shown. Method 1100 is one embodiment of a method performed by an arbitration circuit (e.g., an arbitration circuit 150) to arbitrate among packets (e.g., packets 210) to transmit on a communication fabric (e.g., a communication fabric 140). Method 1100 can include more or fewer steps than shown—e.g., method 1100 may not include steps 1140 and 1150.

Method 1100 begins in step 1110 with the arbitration circuit receiving a first command-data packet (e.g., a command-data packet 320) and a first command packet (e.g., a command packet 310) during a first arbitration cycle. The arbitration circuit may be part of an integrated circuit that comprises a plurality of agent circuits configured to transmit packets on the fabric of the integrated circuit. In step 1120, based on an immediately preceding arbitration cycle having no winning packet, the arbitration circuit selects, in accordance with a non-LRG arbitration scheme (e.g., non-LRG arbitration scheme 514), one of the first command-data packet and the first command packet as a winning packet to transmit on the communication fabric of the integrated circuit. The arbitration circuit may implement the non-LRG arbitration scheme for the first arbitration cycle based on the immediately preceding arbitration cycle to the first arbitration cycle having no winning packet, a detection that a frequency difference associated with a plurality of buses of the communication fabric does not satisfy a difference threshold during the first arbitration cycle, and a detection that a packet was selected in an oldest preceding arbitration cycle within a fixed window (e.g., fixed window 600) of preceding arbitration cycles. The non-LRG arbitration scheme may cause the arbitration circuit to select a command-data packet to transmit on the communication fabric based on a packet of an oldest preceding arbitration cycle in the fixed window of preceding arbitration cycles being another command-data packet. In step 1130, the arbitration circuit transmits the selected packet.

In step 1140, the arbitration circuit receives a second command-data packet and a second command packet during a second arbitration cycle. In step 1150, based on an immediately preceding arbitration cycle to the second arbitration cycle having a winning packet, the arbitration circuit selects, in accordance with an LRG arbitration scheme (e.g., LRG arbitration scheme 512), one of the second command-data packet and the second command packet to transmit on the communication fabric. The arbitration circuit may receive a third command-data packet and a third command packet during a third arbitration cycle. Based on an immediately preceding arbitration cycle to the third arbitration cycle having no winning packet and a detection that a frequency difference associated with a plurality of buses of the communication fabric satisfies a difference threshold during the third arbitration cycle, the arbitration circuit may select, in accordance with the LRG arbitration scheme, one of the third command-data packet and the third command packet to transmit on the communication fabric. Based on a detection that the fixed window of preceding arbitration cycles has no arbitration cycle with a winning packet, the arbitration circuit may select, in accordance with the LRG arbitration scheme, one of the third command-data packet and the third command packet to transmit on the communication fabric.

Turning now to FIG. 12, a flow diagram of a method 1200 is shown. Method 1200 is one embodiment of a method performed by a system (e.g., system 100) to arbitrate among packets (e.g., packets 210) to transmit on a communication fabric (e.g., a communication fabric 140). Method 1200 can include more or fewer steps than shown. For example, method 1200 may include steps in which the system receives only a command-data packet or a command packet and transmits the received packet as a winning packet on the communication fabric.

Method 1200 begins in step 1210 with the system receiving a command-data packet (e.g., a command-data packet 320) and a command packet (e.g., a command packet 310). The system may include a communication fabric, at least one memory controller circuit (e.g., a memory controller circuit 120) coupled to the communication fabric and configured to couple to a memory (e.g., a memory 125), and a plurality of agent circuits (e.g., agent circuits 130A-D) coupled to the communication fabric and configured to transmit packets to read and write data with respect to the memory. In various embodiments, the communication fabric includes a plurality of queues configured to store ones of the packets, including command-data packets and command packets, and an arbitration circuit (e.g., an arbitration circuit 150) configured to arbitrate among packets stored in the plurality of queues to transmit on the communication fabric. The system may include a first lower-level arbitration circuit configured to arbitrate among a first set of the plurality of queues to provide a command-data packet to the arbitration circuit and a second lower-level arbitration circuit configured to arbitrate among a second set of the plurality of queues to provide a command packet to the arbitration circuit. The arbitration circuit may be configured to transmit the data of a given command-data packet as a plurality of beats on the communication fabric, where the plurality of beats defines a minimum cadence at which the command-data packets are transmittable on the communication fabric.

In step 1220, the system selects, as a winning packet for a particular arbitration cycle, the command-data packet to maintain the minimum cadence even in the event that the most recently selected packet was another command-data packet. In particular, the arbitration circuit may select the command-data packet as the winning packet. The arbitration circuit may be configured to select a winning packet for a first arbitration cycle in accordance with a LRG arbitration scheme based on a detection that an immediately preceding arbitration cycle has a winning packet. The arbitration circuit may also be configured to select a winning packet for a second arbitration cycle in accordance with the LRG arbitration scheme based on a detection that a fixed window of preceding arbitration cycles has no arbitration cycle with a winning packet.

In step 1230, the system transmits the winning packet on the communication fabric. In various embodiments, the communication fabric includes a command bus that is configured to transmit commands and a data bus that is configured to transmit data of command-data packets. The arbitration circuit may be configured to transmit, during a first cycle, a first portion of data of the command-data packet on the data bus and a command of the command-data packet on the command bus. The arbitration circuit may be configured to transmit, during a second cycle that is subsequent to the first cycle, a second portion of the data of the command-data packet on the data bus and a command of another command packet on the command bus.

Turning now to FIG. 13, a flow diagram of a method 1300 is shown. Method 1300 is one embodiment of a method performed by a system (e.g., system 100) to arbitrate among packets (e.g., packets 210) to transmit on a communication fabric (e.g., a communication fabric 140). Method 1300 can include more or fewer steps than shown. For example, method 1300 may include a step in which the system transmits a winning packet on the communication fabric.

In various embodiments, the system comprises a plurality of agent circuits (e.g., agent circuits 130A-D) and one or more co-packaged integrated circuits (e.g., integrated circuit dies 115A and 115B). The plurality of agent circuits may include a central processing circuit (e.g., a CPU complex 134) having a set of processor circuits, a graphics processing unit (e.g., a GPU complex 136) having a set of graphics processor circuits, and a memory controller circuit (e.g., a memory controller circuit 120) configured to couple to a memory (e.g., a memory 125). The system also includes a communication fabric that is coupled to ones of the plurality of agent circuits and includes a plurality of network interface circuits (e.g., network interfaces 230). The agent circuits may be configured to transmit, via the communication fabric, packets, including particular packets to read and write data with respect to the memory. In various embodiments, a particular one of the plurality of network interface circuits includes a plurality of queues (e.g., command packet queues 410 and command-data packet queues 420) configured to store ones of the packets, including command-data packets (e.g., command-data packets 320) and command packets (e.g., command packets 310). A command-data packet includes a command and data, and a command packet includes a command without data. The command-data packets may be allocated to a first plurality of virtual channels (e.g., virtual channels 710D-F) while the command packets may be allocated to a second plurality of virtual channels (e.g., virtual channels 710A-C).

Method 1300 begins in step 1310 with the system arbitrating among the first plurality of virtual channels to select a command-data packet. The system may arbitrate among the first plurality of virtual channels based on a first plurality of counter values (e.g., counter values 815) and a first plurality of weight values (e.g., weight values 830) associated with the first plurality of virtual channels. The system may increment, based on a particular one of the first plurality of weight values that corresponds to a first virtual channel associated with the selected command-data packet, a particular one of the first plurality of counter values that corresponds to the first virtual channel. In some cases, the system increments, based on the first plurality of weight values, a first one of the first plurality of counter values by a different amount than a second one of the first plurality of counter values. In various embodiments, the system resets the first plurality of counter values to a first default value (e.g., zero) based on a detection that at least one of the first plurality of counter values satisfies a first saturation threshold value (e.g., a counter reaches a certain value). A particular one of the first plurality of virtual channels may include a first channel associated with a first set of command-data packets of a command-data packet type and a second channel associated with a second set of command-data packets of the command-data packet type. The first channel may be associated with a different weight value of the first plurality of weight values than the second channel.

Based on a detection that a particular one of the first plurality of counter values has a lowest value relative to remaining ones of the first plurality of counter values, the system may select the command-data packet from a particular one of the first plurality of virtual channels that corresponds to the particular counter value. Based on a detection that multiple ones of the first plurality of counter values have a same lowest value relative to remaining ones of the first plurality of counter values, the system may select the command-data packet from a particular one of the first plurality of virtual channels based on the first plurality of weights values.

In step 1320, the system arbitrates among the second plurality of virtual channels to select a command packet. The system may arbitrate among the second plurality of virtual channels based on a second plurality of counter values and a second plurality of weight values associated with the second plurality of virtual channels. The system may increment, based on a particular one of the second plurality of weight values that corresponds to a second virtual channel associated with the selected command packet, a particular one of the second plurality of counter values that corresponds to the second virtual channel. In some cases, the system increments, based on the second plurality of weight values, a first one of the second plurality of counter values by a different amount than a second one of the second plurality of counter values. In various embodiments, the system resets the second plurality of counter values to a second default value based on a detection that at least one of the second plurality of counter values satisfies a second saturation threshold value.

In step 1330, the system arbitrates between the selected command-data packet and the selected command packet to select a winning packet to transmit based on a history of previously selected packets (e.g., arbitration history 520) in a plurality of previous arbitration cycles (e.g., arbitration cycles 610). In various embodiments, the system is configured to select the selected command-data packet as the winning packet based on a selected packet of an oldest preceding arbitration cycle within a fixed window (e.g., fixed window 600) of the history being a command-data packet and an immediately preceding arbitration cycle having no winning packet.

In various embodiments, system includes an arbitration circuit (e.g., arbitration circuit 150) comprising first and second lower-level arbitration circuits (e.g., lower-level arbitration circuits 430A and 430B) that are coupled to a higher-level arbitration circuit (e.g., higher-level arbitration circuit 440). The first lower-level arbitration circuit may be configured to arbitrate among the first plurality of virtual channels and transmit the selected command-data packet to the higher-level arbitration circuit while the second lower-level arbitration circuit may be configured to arbitrate among the second plurality of virtual channels and transmit the selected command packet to the higher-level arbitration circuit. The higher-level arbitration circuit may be configured to arbitrate between the selected command-data and command packets to select the winning packet.

Turning now to FIG. 14, a flow diagram of a method 1400 is shown. Method 1400 is one embodiment of a method performed by an arbitration circuit (e.g., arbitration circuit 150) to arbitrate among packets (e.g., packets 210) to transmit on a communication fabric (e.g., a communication fabric 140). Method 1400 may include more or fewer steps than shown. For example, method 1400 may include a step in which the system transmits a winning packet on the communication fabric.

Method 1400 begins in step 1410 with the arbitration circuit arbitrating among a first set of queues (e.g., command-data packet queues 420) that store command-data packets (e.g., command-data packets 320) to select a command-data packet. The arbitration circuit may be included in an integrated circuit that comprises a plurality of agent circuits (e.g., agent circuits 130A-D) configured to transmit packets on the communication fabric of the integrated circuit. In various embodiments, the arbitrating among the first set of queues is based on a plurality of counter values (e.g., counter values 815) and a plurality of weight values (e.g., weight values 830). The arbitration circuit may increment a first particular one of the plurality of counter values that corresponds to a particular one of the first set of queues that is associated with the selected command-data packet. In some cases, the arbitration circuit may determine that the first particular counter value satisfies a saturation threshold value after being incremented and based on the determining, reset at least two of the plurality of counter values to a default value. The first particular counter value may be incremented by an amount that is based on a particular one of the plurality of weight values that corresponds to the particular queue, and the amount may be different than an amount by which a second particular one of the plurality of counter values is incremented.

In step 1420, the arbitration circuit arbitrates among a second set of queues (e.g., command packet queues 410) that store command packets (e.g., command packets 310) to select a command packet. A command packet includes a command without data. The first set of queues may implement a first set of virtual channels (e.g., virtual channels 710D-F) that corresponds to write transactions and the second set of queues may implement a second set of virtual channels (e.g., virtual channels 710A-C) that corresponds to read transactions. In some embodiments, the arbitrating among the first set of queues and the arbitrating among the second set of queues are based on a weighted LRG arbitration scheme.

In step 1430, the arbitration circuit arbitrates between the selected command-data packet and the selected command packet to select a winning packet based on a history of previously selected packets in a plurality of previous arbitration cycles (e.g., arbitration cycles 610). The arbitrating between the selected command-data packet and the selected command packet may be based on one of a plurality of arbitration schemes (e.g., arbitration schemes 512 and 514) selected based on outcomes of a fixed window (e.g., fixed window 600) of the history of previously selected packets. In step 1440, the arbitration circuit transmits the winning packet on the communication fabric of the integrated circuit.

Turning now to FIG. 15, a flow diagram of a method 1500 is shown. Method 1500 is one embodiment of a method performed by a system (e.g., system 100) to arbitrate among packets (e.g., packets 210) to transmit on a communication fabric (e.g., a communication fabric 140). Method 1500 can include more or fewer steps than shown. For example, method 1500 may include a step in which the system transmits a winning packet on the communication fabric.

In various embodiments, the system comprises a plurality of agent circuits (e.g., agent circuits 130A-D) and one or more co-packaged integrated circuits (e.g., integrated circuit dies 115A and 115B). The plurality of agent circuits may include a central processing circuit (e.g., a CPU complex 134) having a set of processor circuits, a graphics processing unit (e.g., a GPU complex 136) having a set of graphics processor circuits, and a memory controller circuit (e.g., a memory controller circuit 120) configured to couple to a memory (e.g., a memory 125). The system also includes a communication fabric coupled to ones of the plurality of agent circuits and includes a plurality of network interface circuits (e.g., network interfaces 230). The agent circuits may be configured to transmit, via the communication fabric, packets to read and write data with respect to the memory. In various embodiments, the communication fabric includes a plurality of queues (e.g., command packet queues 410 and command-data packet queues 420) configured to store ones of the packets, including command-data packets (e.g., command-data packets 320) and command packets (e.g., command packets 310). A command-data packet includes a command and data, and a command packet includes a command without data.

Method 1500 begins in step 1510 with the system arbitrating among the command-data packets to select a command-data packet. In various embodiments, the system comprises an arbitration circuit (e.g., arbitration circuit 150) configured to arbitrate among packets stored in the plurality of queues to transmit on the communication fabric. The arbitration circuit may include first and second lower-level arbitration circuits (e.g., lower-level arbitration circuits 430A and 430B) coupled to a higher-level arbitration circuit (e.g., higher-level arbitration circuit 440). In various embodiments, the first lower-level arbitration circuit is configured to arbitrate among the command-data packets to select a command-data packet. The first lower-level arbitration circuit may arbitrate among the command-data packets based on a first plurality of counter values (e.g., counter values 815) and a first plurality of weight values (e.g., weight values 830) associated with a first set of queues (e.g., command-data packet queues 420) coupled to the first lower-level arbitration circuit. The first set of queues may store the command-data packets in association with a first plurality of virtual channels.

In step 1520, the system arbitrates among the command packets to select a command packet. In various embodiments, the second lower-level arbitration circuit is configured to arbitrate among the command packets to select a command packet. The second lower-level arbitration circuit may arbitrate among the command packets based on a second plurality of counter values and a second plurality of weight values associated with a second set of queues (e.g., command packet queues 410) coupled to the second lower-level arbitration circuit. The second set of queues may store the command packets in association with a second plurality of virtual channels. A particular one of the first plurality of virtual channels and a particular of the second plurality of virtual channels correspond to a same virtual channel type (e.g., bulk) but are associated with different weight values.

In step 1530, the system arbitrates between the selected command-data packet and the selected command packet to select a winning packet to transmit on the communication fabric based on a history of previously selected packets in a plurality of previous arbitration cycles. In various embodiments, the higher-level arbitration circuit is configured to arbitrate between the selected command-data packet and the selected command packet to select a winning packet.

Example Device

Figure 16:
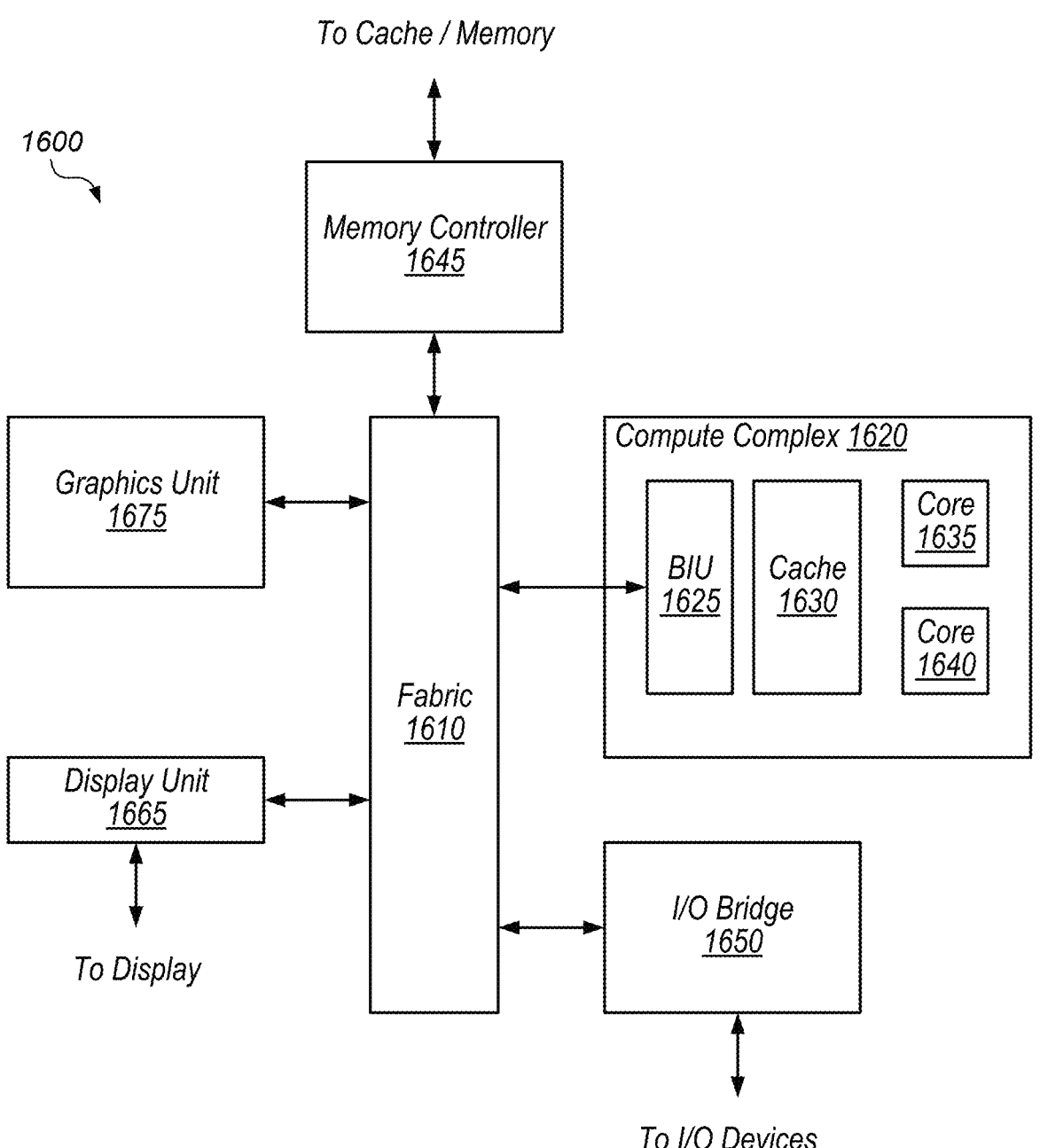
FIG. 16 is a block diagram illustrating elements of a device that implements components described in the present disclosure, according to some embodiments.

Referring now to FIG. 16, a block diagram illustrating an example embodiment of a device 1600 is shown. In various embodiments, device 1600 implements functionality of system 100. In some embodiments, elements of device 1600 may be included within a system on a chip. In some embodiments, device 1600 may be included in a mobile device, which may be battery-powered. Therefore, power consumption by device 1600 may be an important design consideration. In the illustrated embodiment, device 1600 includes fabric 1610, compute complex 1620 input/output (I/O) bridge 1650, cache/memory controller 1645, graphics unit 1675, and display unit 1665. In some embodiments, device 1600 may include other components (not shown) in addition to or in place of the illustrated components, such as video processor encoders and decoders, image processing or recognition elements, computer vision elements, etc. Fabric 1610 may correspond to a communication fabric 140, compute complex 134 may correspond to CPU complex 134, memory controller 1645 may correspond to a memory controller circuit 120, I/O bridge 1650 may include I/O circuit 132, and graphics unit 1675 may correspond to GPU complex 136B.

Fabric 1610 may include various interconnects, buses, MUX's, controllers, etc., and may be configured to facilitate communication between various elements of device 1600. In some embodiments, portions of fabric 1610 may be configured to implement various different communication protocols. In other embodiments, fabric 1610 may implement a single communication protocol and elements coupled to fabric 1610 may convert from the single communication protocol to other communication protocols internally.

In the illustrated embodiment, compute complex 1620 includes bus interface unit (BIU) 1625, cache 1630, and cores 1635 and 1640. In various embodiments, compute complex 1620 may include various numbers of processors, processor cores and caches. For example, compute complex 1620 may include 1, 2, or 4 processor cores, or any other suitable number. In one embodiment, cache 1630 is a set associative L2 cache. In some embodiments, cores 1635 and 1640 may include internal instruction and data caches. In some embodiments, a coherency unit (not shown) in fabric 1610, cache 1630, or elsewhere in device 1600 may be configured to maintain coherency between various caches of device 1600. BIU 1625 may be configured to manage communication between compute complex 1620 and other elements of device 1600. Processor cores such as cores 1635 and 1640 may be configured to execute instructions of a particular instruction set architecture (ISA) which may include operating system instructions and user application instructions. These instructions may be stored in computer readable medium such as a memory coupled to memory controller 1645 discussed below.

As used herein, the term "coupled to" may indicate one or more connections between elements, and a coupling may include intervening elements. For example, in FIG. 16, graphics unit 1675 may be described as "coupled to" a memory through fabric 1610 and cache/memory controller 1645. In contrast, in the illustrated embodiment of FIG. 16, graphics unit 1675 is "directly coupled" to fabric 1610 because there are no intervening elements.

Cache/memory controller 1645 may be configured to manage transfer of data between fabric 1610 and one or more caches and memories. For example, cache/memory controller 1645 may be coupled to an L3 cache, which may in turn be coupled to a system memory. In other embodiments, cache/memory controller 1645 may be directly coupled to a memory. In some embodiments, cache/memory controller 1645 may include one or more internal caches. Memory coupled to controller 1645 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 1645 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 1620 to cause the computing device to perform functionality described herein.

Graphics unit 1675 may include one or more processors, e.g., one or more graphics processing units (GPUs). Graphics unit 1675 may receive graphics-oriented instructions, such as OPENGL®, Metal®, or DIRECT3D® instructions, for example. Graphics unit 1675 may execute specialized GPU instructions or perform other operations based on the received graphics-oriented instructions. Graphics unit 1675 may generally be configured to process large blocks of data in parallel and may build images in a frame buffer for output to a display, which may be included in the device or may be a separate device. Graphics unit 1675 may include transform, lighting, triangle, and rendering engines in one or more graphics processing pipelines. Graphics unit 1675 may output pixel information for display images. Graphics unit 1675, in various embodiments, may include programmable shader circuitry which may include highly parallel execution cores configured to execute graphics programs, which may include pixel tasks, vertex tasks, and compute tasks (which may or may not be graphics-related).

Display unit 1665 may be configured to read data from a frame buffer and provide a stream of pixel values for display. Display unit 1665 may be configured as a display pipeline in some embodiments. Additionally, display unit 1665 may be configured to blend multiple frames to produce an output frame. Further, display unit 1665 may include one or more interfaces (e.g., MIPI® or embedded display port (eDP)) for coupling to a user display (e.g., a touchscreen or an external display).

I/O bridge 1650 may include various elements configured to implement: universal serial bus (USB) communications, security, audio, and low-power always-on functionality, for example. I/O bridge 1650 may also include interfaces such as pulse-width modulation (PWM), general-purpose input/output (GPIO), serial peripheral interface (SPI), and inter-integrated circuit (I2C), for example. Various types of peripherals and devices may be coupled to device 1600 via I/O bridge 1650.

In some embodiments, device 1600 includes network interface circuitry (not explicitly shown), which may be connected to fabric 1610 or I/O bridge 1650. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1600 with connectivity to various types of other devices and networks.

Example Applications

Figure 17:
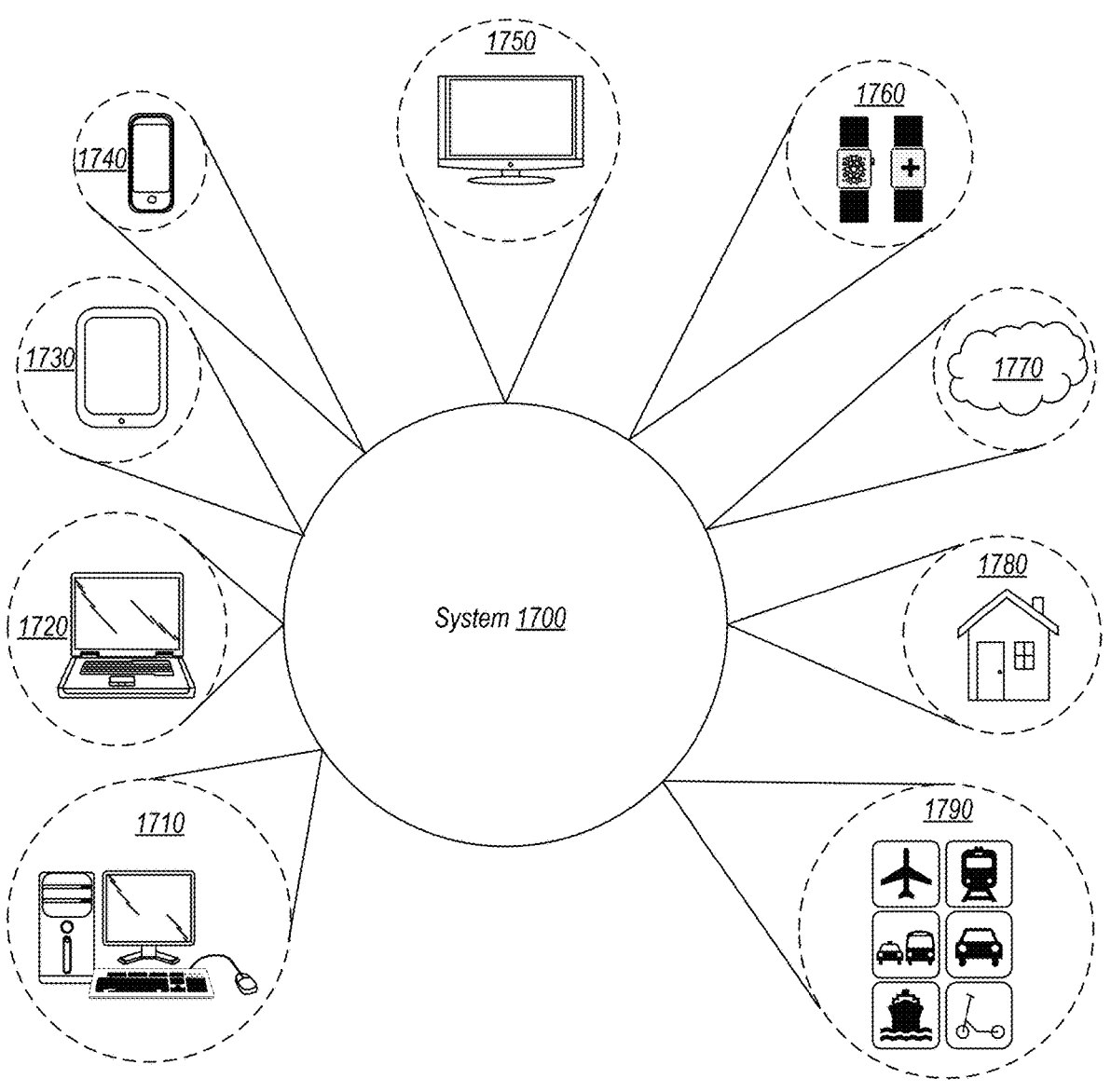
FIG. 17 is a block diagram illustrating an example of a system used in various types of applications, according to some embodiments.

Turning now to FIG. 17, various types of systems that may include any of the circuits, devices, or system discussed above. System or device 1700, which may incorporate or otherwise utilize one or more of the techniques described herein (e.g., system 1700 may implement system 100), may be utilized in a wide range of areas. For example, system or device 1700 may be utilized as part of the hardware of systems such as a desktop computer 1710, laptop computer 1720, tablet computer 1730, cellular or mobile phone 1740, or television 1750 (or set-top box coupled to a television).

Similarly, disclosed elements may be utilized in a wearable device 1760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1700 may also be used in various other contexts. For example, system or device 1700 may be utilized in the context of a server computer system, such as a dedicated server or on shared hardware that implements a cloud-based service 1770. Still further, system or device 1700 may be implemented in a wide range of specialized everyday devices, including devices 1780 commonly found in the home such as refrigerators, thermostats, security cameras, etc. The interconnection of such devices is often referred to as the "Internet of Things" (IoT). Elements may also be implemented in various modes of transportation. For example, system or device 1700 could be employed in the control systems, guidance systems, entertainment systems, etc. of various types of vehicles 1790.

The applications illustrated in FIG. 17 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 18:
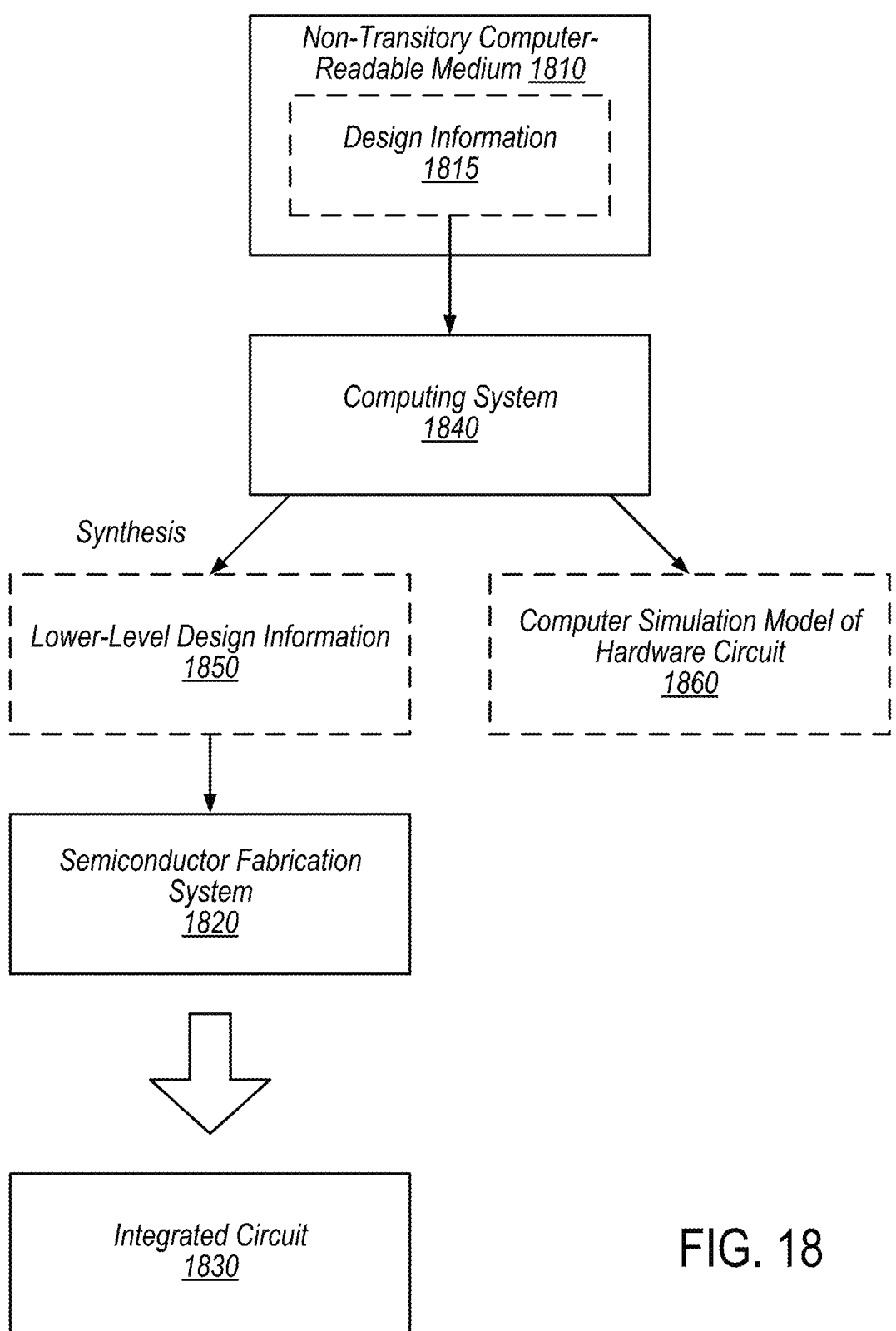
FIG. 18 is a block diagram illustrating an example process of fabricating an integrated circuit, according to some embodiments.

FIG. 18 is a block diagram illustrating an example non-transitory computer-readable storage medium that stores circuit design information, according to some embodiments. In the illustrated embodiment, computing system 1840 is configured to process the design information. This may include executing instructions included in the design information, interpreting instructions included in the design information, compiling, transforming, or otherwise updating the design information, etc. Therefore, the design information controls computing system 1840 (e.g., by programming computing system 1840) to perform various operations discussed below, in some embodiments.

In the illustrated example, computing system 1840 processes the design information to generate both a computer simulation model of a hardware circuit 1860 and lower-level design information 1850. In other embodiments, computing system 1840 may generate only one of these outputs, may generate other outputs based on the design information, or both. Regarding the computing simulation, computing system 1840 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1840 also processes the design information to generate lower-level design information 1850 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1850 (potentially among other inputs), semiconductor fabrication system 1820 is configured to fabricate an integrated circuit 1830 (which may correspond to functionality of the simulation model 1860). Note that computing system 1840 may generate different simulation models based on design information at various levels of description, including information 1850, 1815, and so on. The data representing design information 1850 and model 1860 may be stored on medium 1810 or on one or more other media.

In some embodiments, the lower-level design information 1850 controls (e.g., programs) the semiconductor fabrication system 1820 to fabricate the integrated circuit 1830. Thus, when processed by the fabrication system, the design information may program the fabrication system to fabricate a circuit that includes various circuitry disclosed herein.

Non-transitory computer-readable storage medium 1810, may comprise any of various appropriate types of memory devices or storage devices. Non-transitory computer-readable storage medium 1810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1810 may include other types of non-transitory memory as well or combinations thereof. Accordingly, non-transitory computer-readable storage medium 1810 may include two or more memory media; such media may reside in different locations—for example, in different computer systems that are connected over a network.

Design information 1815 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1840, semiconductor fabrication system 1820, or both. In some embodiments, design information may also include one or more cell libraries that specify the synthesis, layout, or both of integrated circuit 1830. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1830 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1820 may also be configured to perform various testing of fabricated circuits for correct operation.

In various embodiments, integrated circuit 1830 and model 1860 are configured to operate according to a circuit design specified by design information 1815, which may include performing any of the functionality described herein. For example, integrated circuit 1830 may include any of various elements shown in FIGS. 1-5, 7, and 8. Further, integrated circuit 1830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1820 to fabricate integrated circuit 1830.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist speci-
fying logic gates and their connectivity). The HDL descrip-
tion may subsequently be synthesized against a library of
cells designed for a given integrated circuit fabrication
technology, and may be modified for timing, power, and
other reasons to result in a final design database that is
transmitted to a foundry to generate masks and ultimately
produce the integrated circuit. Some hardware circuits or
portions thereof may also be custom-designed in a schematic
editor and captured into the integrated circuit design along
with synthesized circuitry. The integrated circuits may
include transistors and other circuit elements (e.g., passive
elements such as capacitors, resistors, inductors, etc.) and
interconnect between the transistors and circuit elements.
Some embodiments may implement multiple integrated cir-
cuits coupled together to implement the hardware circuits,
and/or discrete elements may be used in some embodiments.
Alternatively, the HDL design may be synthesized to a
programmable logic array such as a field programmable gate
array (FPGA) and may be implemented in the FPGA. This
decoupling between the design of a group of circuits and the
subsequent low-level implementation of these circuits com-
monly results in the scenario in which the circuit or logic
designer never specifies a particular set of structures for the
low-level implementation beyond a description of what the
circuit is configured to do, as this process is performed at a
different stage of the circuit implementation process.

The fact that many different low-level combinations of
circuit elements may be used to implement the same speci-
fication of a circuit results in a large number of equivalent
structures for that circuit. As noted, these low-level circuit
implementations may vary according to changes in the
fabrication technology, the foundry selected to manufacture
the integrated circuit, the library of cells provided for a
particular project, etc. In many cases, the choices made by
different design tools or methodologies to produce these
different implementations may be arbitrary.

Moreover, it is common for a single implementation of a
particular functional specification of a circuit to include, for
a given embodiment, a large number of devices (e.g.,
millions of transistors). Accordingly, the sheer volume of
this information makes it impractical to provide a full
recitation of the low-level structure used to implement a
single embodiment, let alone the vast array of equivalent
possible implementations. For this reason, the present dis-
closure describes structure of circuits using the functional
shorthand commonly employed in the industry.

What is claimed is:

1. An apparatus, comprising:
   a plurality of agent circuits of a computer system that
   includes one or more co-packaged integrated circuits,
   wherein the plurality of agent circuits includes a
   memory controller circuit that is configured to couple
   to a memory; and
   a communication fabric that is coupled to ones of the
   plurality of agent circuits and includes a plurality of
   network interface circuits, wherein the agent circuits
   are configured to transmit, via the communication
   fabric, packets, including particular packets to read and
   write data with respect to the memory, and wherein a
   particular one of the plurality of network interface
   circuits includes:
      a plurality of queues configured to store ones of the
      packets, including command-data packets and com-
      mand packets, wherein a command-data packet
      includes a command and data, and a command
      packet includes a command without data, and wherein the command-data packets are allocated to a
   first plurality of virtual channels and the command
   packets are allocated to a second plurality of virtual
   channels; and
   an arbitration circuit configured to arbitrate among
   packets stored in the plurality of queues to transmit
   on the communication fabric, wherein the arbitration
   circuit is configured to:
      arbitrate among the first plurality of virtual channels
      to select a command-data packet;
      arbitrate among the second plurality of virtual chan-
      nels to select a command packet; and
      arbitrate between the selected command-data packet
      and the selected command packet to select a
      winning packet to transmit based on a history of
      previously selected packets in a plurality of pre-
      vious arbitration cycles.

2. The apparatus of claim 1, wherein the arbitration circuit
is configured to:
   arbitrate among the first plurality of virtual channels
   based on a first plurality of counter values and a first
   plurality of weight values associated with the first
   plurality of virtual channels; and
   arbitrate among the second plurality of virtual channels
   based on a second plurality of counter values and a
   second plurality of weight values associated with the
   second plurality of virtual channels.

3. The apparatus of claim 2, wherein the arbitration circuit
is configured to:
   increment, based on a particular one of the first plurality
   of weight values that corresponds to a first virtual
   channel associated with the selected command-data
   packet, a particular one of the first plurality of counter
   values that corresponds to the first virtual channel; and
   increment, based on a particular one of the second plu-
   rality of weight values that corresponds to a second
   virtual channel associated with the selected command
   packet, a particular one of the second plurality of
   counter values that corresponds to the second virtual
   channel.

4. The apparatus of claim 2, wherein the arbitration circuit
is configured to:
   increment, based on the first plurality of weight values, a
   first one of the first plurality of counter values by a
   different amount than a second one of the first plurality
   of counter values; and
   increment, based on the second plurality of weight values,
   a first one of the second plurality of counter values by
   a different amount than a second one of the second
   plurality of counter values.

5. The apparatus of claim 2, wherein the arbitration circuit
is configured to:
   based on a detection that a particular one of the first
   plurality of counter values has a lowest value relative to
   remaining ones of the first plurality of counter values,
   select the command-data packet from a particular one
   of the first plurality of virtual channels that corresponds
   to the particular counter value.

6. The apparatus of claim 2, wherein the arbitration circuit
is configured to:
   based on a detection that multiple ones of the first
   plurality of counter values have a same lowest value
   relative to remaining ones of the first plurality of
   counter values, select the command-data packet from a
   particular one of the first plurality of virtual channels
   based on the first plurality of weights values.

7. The apparatus of claim 2, wherein the arbitration circuit is configured to:

reset the first plurality of counter values to a first default value based on a detection that at least one of the first plurality of counter values satisfies a first saturation threshold value; and reset the second plurality of counter values to a second default value based on a detection that at least one of the second plurality of counter values satisfies a second saturation threshold value.

8. The apparatus of claim 2, wherein a particular one of the first plurality of virtual channels includes a first channel associated with a first set of command-data packets of a command-data packet type and a second channel associated with a second set of command-data packets of the command-data packet type, and wherein the first channel is associated with a different weight value of the first plurality of weight values than the second channel.

9. The apparatus of claim 1, wherein the arbitration circuit includes first and second lower-level arbitration circuits that are coupled to a higher-level arbitration circuit, wherein the first lower-level arbitration circuit is configured to arbitrate among the first plurality of virtual channels and transmit the selected command-data packet to the higher-level arbitration circuit, wherein the second lower-level arbitration circuit is configured to arbitrate among the second plurality of virtual channels and transmit the selected command packet to the higher-level arbitration circuit, and wherein the higher-level arbitration circuit is configured to arbitrate between the selected command-data packet and the selected command packet to select the winning packet.

10. The apparatus of claim 1, wherein the arbitration circuit is configured to select the selected command-data packet as the winning packet based on a selected packet of an oldest preceding arbitration cycle within a fixed window of the history being a command-data packet and an immediately preceding arbitration cycle having no winning packet.

11. The apparatus of claim 1, wherein the plurality of agent circuits includes a central processing circuit having a set of processor circuits and a graphics processing unit having a set of graphics processor circuits.

12. A method, comprising:

arbitrating, by an arbitration circuit of an integrated circuit that comprises a plurality of agent circuits configured to transmit packets on a communication fabric of the integrated circuit, among a first set of queues storing command-data packets to select a command-data packet, wherein a given command-data packet includes a command and data;

arbitrating, by the arbitration circuit, among a second set of queues storing command packets to select a command packet, wherein a given command packet includes a command without data;

arbitrating, by the arbitration circuit, between the selected command-data packet and the selected command packet to select a winning packet based on a history of previously selected packets in a plurality of previous arbitration cycles; and transmitting, by the arbitration circuit, the winning packet on the communication fabric of the integrated circuit.

13. The method of claim 12, wherein the arbitrating among the first set of queues and the arbitrating among the second set of queues are based on a weighted least-recently-granted arbitration scheme, and wherein the arbitrating between the selected command-data packet and the selected command packet is based on one of a plurality of arbitration schemes that is selected based on outcomes of a fixed window of the history of previously selected packets.

14. The method of claim 12, wherein the arbitrating among the first set of queues is based on a plurality of counter values and a plurality of weight values, and wherein the method further comprises:

incrementing, by the arbitration circuit, a first particular one of the plurality of counter values that corresponds to a particular one of the first set of queues that is associated with the selected command-data packet; and determining, by the arbitration circuit, that the first particular counter value satisfies a saturation threshold value after being incremented; and based on the determining, the arbitration circuit resetting at least two of the plurality of counter values to a default value.

15. The method of claim 14, wherein the first particular counter value is incremented by an amount that is based on a particular one of the plurality of weight values that corresponds to the particular queue, and wherein the amount is different than an amount by which a second particular one of the plurality of counter values is incremented.

16. The method of claim 12, wherein the first set of queues implements a first set of virtual channels that corresponds to write transactions and the second set of queues implements a second set of virtual channels that corresponds to read transactions.

17. An integrated circuit, comprising:

a communication fabric; and at least one memory controller circuit coupled to the communication fabric and configured to couple to a memory; and a plurality of agent circuits coupled to the communication fabric and configured to transmit packets to read and write data with respect to the memory;

wherein the communication fabric includes:

a plurality of queues configured to store ones of the packets, including command-data packets and command packets, wherein a command-data packet includes a command and data, and a command packet includes a command without data; and an arbitration circuit configured to arbitrate among packets stored in the plurality of queues to transmit on the communication fabric, wherein the arbitration circuit includes first and second lower-level arbitration circuits that are coupled to a higher-level arbitration circuit, wherein the first lower-level arbitration circuit is configured to arbitrate among the command-data packets to select a command-data packet, wherein the second lower-level arbitration circuit is configured to arbitrate among the command packets to select a command packet, and wherein the higher-level arbitration circuit is configured to arbitrate between the selected command-data packet and the selected command packet to select a winning packet to transmit based on a history of previously selected packets in a plurality of previous arbitration cycles.

18. The integrated circuit of claim 17, wherein a first set of the plurality of queues is coupled to the first lower-level arbitration circuit and configured to store the command-data packets in association with a first plurality of virtual channels, and wherein a second set of the plurality of queues is coupled to the second lower-level arbitration circuit and configured to store the command packets in association with a second plurality of virtual channels.

19. The integrated circuit of claim 18, wherein the first lower-level arbitration circuit is configured to arbitrate among the command-data packets based on a first plurality of counter values and a first plurality of weight values associated with the first set of queues, and wherein the second lower-level arbitration circuit is configured to arbitrate among the command packets based on a second plurality of counter values and a second plurality of weight values associated with the second set of queues.

20. The integrated circuit of claim 18, wherein the higher-level arbitration circuit is configured to select the selected command packet as the winning packet based on a selected packet of an oldest preceding arbitration cycle within a fixed window of the history being a command packet and an immediately preceding arbitration cycle having no winning packet.

* * * * *